(12) United States Patent
Guo et al.

(10) Patent No.: US 10,007,679 B2
(45) Date of Patent: Jun. 26, 2018

(54) ENHANCED MAX MARGIN LEARNING ON MULTIMODAL DATA MINING IN A MULTIMEDIA DATABASE

(71) Applicant: The Research Foundation for The State University of New York, Binghamton, NY (US)

(72) Inventors: Zhen Guo, Warrington, PA (US); Zhongfei Zhang, Vestal, NY (US)

(73) Assignee: The Research Foundation for the State University of New York, Binghamton, NY (US)

( * ) Notice: Subject to any disclaimer, the term of this patent is extended or adjusted under 35 U.S.C. 154(b) by 497 days.

(21) Appl. No.: 14/583,893

(22) Filed: Dec. 29, 2014

(65) Prior Publication Data

US 2015/0186423 A1    Jul. 2, 2015

Related U.S. Application Data

(60) Continuation of application No. 13/903,018, filed on May 28, 2013, now Pat. No. 8,923,630, which is a
(Continued)

(51) Int. Cl.
G06K 9/62       (2006.01)
G06F 17/30      (2006.01)
G06F 17/10      (2006.01)

(52) U.S. Cl.
CPC ........ G06F 17/30256 (2013.01); G06F 17/10 (2013.01); G06F 17/30 (2013.01);
(Continued)

(58) Field of Classification Search
CPC ......... G06F 17/30247; G06F 17/30265; G06F 17/30256; G06F 19/24; G06F 17/30864;
(Continued)

(56) References Cited

U.S. PATENT DOCUMENTS 5,701,400 A    12/1997 Amado
5,799,312 A     8/1998 Rigoutsos
(Continued)

OTHER PUBLICATIONS

Guo et al., Enhanced Max Margin Learning on Multimodal Data Mining in a Multimedia Database, Aug. 12-15, 2007 [retrieved Jan. 5, 2017], Proceedings of the 13th ACM SIGKDD International Conference on Knowledge Discovery and Data Mining, pp. 340-349. Retrieved from the Internet: http://dl.acm.org/citation.cfm?id=1281231.*

(Continued)

*Primary Examiner* — Andrew Moyer
*Assistant Examiner* — Dennis Rosario
(74) *Attorney, Agent, or Firm* — Steven M. Hoffberg; Tully Rinckey, PLLC

(57) ABSTRACT

Multimodal data mining in a multimedia database is addressed as a structured prediction problem, wherein mapping from input to the structured and interdependent output variables is learned. A system and method for multimodal data mining is provided, comprising defining a multimodal data set comprising image information; representing image information of a data object as a set of feature vectors in a feature space; clustering in the feature space to group similar features; associating a non-image representation with a respective image data object based on the clustering; determining a joint feature representation of a respective data object as a mathematical weighted combination of a set of components of the joint feature representation; optimizing a weighting for a plurality of components of the mathematical weighted combination with respect to a prediction error between a predicted classification and a training classification; and employing the mathematical weighted combination for automatically classifying a new data object.

20 Claims, 6 Drawing Sheets

Related U.S. Application Data division of application No. 12/538,845, filed on Aug. 10, 2009, now Pat. No. 8,463,053.

(60) Provisional application No. 61/087,169, filed on Aug. 8, 2008.

(52) U.S. Cl.
CPC ......... *G06F 17/30017* (2013.01); *G06K 9/62* (2013.01); *G06K 9/629* (2013.01); *G06K 9/6218* (2013.01); *G06K 9/6269* (2013.01)

(58) Field of Classification Search
CPC ..... Y10S 707/99933; Y10S 707/99934; Y10S 707/99935; G06N 99/005; G06N 5/04; G06K 9/6269; G06K 9/46; G06K 9/00268; G06K 9/66; G06K 9/6228; G06K 9/6231; G06K 9/6256; G06T 7/0012

See application file for complete search history.

(56) References Cited

U.S. PATENT DOCUMENTS

| | | |
|---|---|---|
| 5,802,525 A | 9/1998 | Rigoutsos |
| 5,805,118 A | 9/1998 | Mishra et al. |
| 5,963,670 A | 10/1999 | Lipson et al. |
| 5,999,664 A | 12/1999 | Mahoney et al. |
| 6,269,189 B1 | 7/2001 | Chanod |
| 6,269,366 B1 | 7/2001 | Romano et al. |
| 6,400,996 B1 | 6/2002 | Hoffberg et al. |
| 6,418,424 B1 | 7/2002 | Hoffberg et al. |
| 6,438,575 B1 | 8/2002 | Khan et al. |
| 6,459,809 B1 | 10/2002 | Jensen et al. |
| 6,504,951 B1 | 1/2003 | Luo et al. |
| 6,512,846 B1 | 1/2003 | Luo |
| 6,549,660 B1 | 4/2003 | Lipson et al. |
| 6,562,077 B2 | 5/2003 | Bobrow et al. |
| 6,564,263 B1 | 5/2003 | Bergman et al. |
| 6,633,846 B1 | 10/2003 | Bennett et al. |
| 6,650,777 B1 | 11/2003 | Jensen et al. |
| 6,665,640 B1 | 12/2003 | Bennett et al. |
| 6,665,841 B1 | 12/2003 | Mahoney et al. |
| 6,714,909 B1 | 3/2004 | Gibbon et al. |
| 6,772,170 B2 | 8/2004 | Pennock et al. |
| 6,804,684 B2 | 10/2004 | Stubler et al. |
| 6,901,411 B2 | 5/2005 | Li et al. |
| 6,922,699 B2 * | 7/2005 | Schuetze ............ G06F 17/3025 |
| 6,925,200 B2 | 8/2005 | Wood et al. |
| 6,970,860 B1 | 11/2005 | Liu et al. |
| 6,976,020 B2 | 12/2005 | Anthony et al. |
| 7,028,253 B1 | 4/2006 | Lieberman et al. |
| 7,050,977 B1 | 5/2006 | Bennett |
| 7,062,085 B2 | 6/2006 | Luo et al. |
| 7,072,501 B2 | 7/2006 | Wood et al. |
| 7,092,573 B2 | 8/2006 | Luo et al. |
| 7,092,928 B1 | 8/2006 | Elad et al. |
| 7,113,958 B1 | 9/2006 | Lantrip et al. |
| 7,137,126 B1 | 11/2006 | Coffman et al. |
| 7,139,714 B2 | 11/2006 | Bennett et al. |
| 7,143,353 B2 | 11/2006 | McGee et al. |
| 7,162,439 B2 | 1/2007 | Panelli |
| 7,184,959 B2 | 2/2007 | Gibbon et al. |
| 7,203,646 B2 | 4/2007 | Bennett |
| 7,209,815 B2 | 4/2007 | Grier et al. |
| 7,225,125 B2 | 5/2007 | Bennett et al. |
| 7,231,381 B2 | 6/2007 | Li et al. |
| 7,242,988 B1 | 7/2007 | Hoffberg et al. |
| 7,254,589 B2 | 8/2007 | Goodwin et al. |
| 7,260,535 B2 | 8/2007 | Galanes et al. |
| 7,277,854 B2 | 10/2007 | Bennett et al. |
| 7,283,992 B2 | 10/2007 | Liu et al. |
| 7,299,213 B2 | 11/2007 | Cristianini |
| 7,336,819 B2 | 2/2008 | Gallagher et al. |
| 7,349,895 B2 | 3/2008 | Liu et al. |
| 7,376,556 B2 | 5/2008 | Bennett |
| 7,383,260 B2 | 6/2008 | Smith et al. |
| 7,383,302 B2 | 6/2008 | Cohen et al. |
| 7,392,185 B2 | 6/2008 | Bennett |
| 7,421,418 B2 | 9/2008 | Nakano |
| 7,430,566 B2 | 9/2008 | Li et al. |
| 7,436,988 B2 | 10/2008 | Zhang et al. |
| 7,457,825 B2 | 11/2008 | Li et al. |
| 7,493,312 B2 | 2/2009 | Liu et al. |
| 7,499,916 B2 | 3/2009 | Liu et al. |
| 7,512,576 B1 | 3/2009 | Syeda-Mahmood et al. |
| 7,523,505 B2 | 4/2009 | Menschik et al. |
| 7,529,732 B2 | 5/2009 | Liu et al. |
| 7,536,713 B1 | 5/2009 | Bartholomew |
| 7,548,915 B2 | 6/2009 | Ramer et al. |
| 7,551,780 B2 | 6/2009 | Nudd et al. |
| 7,555,431 B2 | 6/2009 | Bennett |
| 7,558,762 B2 | 7/2009 | Owechko et al. |
| 7,562,011 B2 | 7/2009 | Carter et al. |
| 7,562,074 B2 | 7/2009 | Liddell et al. |
| 7,587,412 B2 | 9/2009 | Weyl et al. |
| 7,590,589 B2 | 9/2009 | Hoffberg |
| 7,599,894 B2 | 10/2009 | Owechko et al. |
| 7,610,260 B2 | 10/2009 | Asukai et al. |
| 7,624,007 B2 | 11/2009 | Bennett |
| 7,627,556 B2 | 12/2009 | Liu et al. |
| 7,633,501 B2 | 12/2009 | Wood et al. |
| 7,636,662 B2 | 12/2009 | Dimtrova et al. |
| 7,636,700 B2 | 12/2009 | Owechko et al. |
| 7,639,387 B2 | 12/2009 | Hull et al. |
| 7,647,225 B2 | 1/2010 | Bennett et al. |
| 7,647,331 B2 | 1/2010 | Li et al. |
| 7,653,530 B2 | 1/2010 | Carter et al. |
| 7,657,424 B2 | 2/2010 | Bennett |
| 7,663,671 B2 | 2/2010 | Gallagher et al. |
| 7,665,041 B2 | 2/2010 | Wilson et al. |
| 7,669,148 B2 | 2/2010 | Hull et al. |
| 7,672,543 B2 | 3/2010 | Hull et al. |
| 7,672,841 B2 | 3/2010 | Bennett |
| 7,672,911 B2 | 3/2010 | Owechko et al. |
| 7,672,952 B2 | 3/2010 | Isaacson et al. |
| 7,676,372 B1 | 3/2010 | Oba |
| 7,676,394 B2 | 3/2010 | Ramer et al. |
| 7,698,131 B2 | 4/2010 | Bennett |
| 7,698,332 B2 | 4/2010 | Liu et al. |
| 7,702,318 B2 | 4/2010 | Ramer et al. |
| 7,702,508 B2 | 4/2010 | Bennett |
| 7,702,660 B2 | 4/2010 | Chan et al. |
| 7,702,673 B2 | 4/2010 | Hull et al. |
| 7,725,307 B2 | 5/2010 | Bennett |
| 7,725,320 B2 | 5/2010 | Bennett |
| 7,725,321 B2 | 5/2010 | Bennett |
| 7,729,904 B2 | 6/2010 | Bennett |
| 7,739,304 B2 | 6/2010 | Naaman et al. |
| 7,756,341 B2 | 7/2010 | Perronnin |
| 7,756,800 B2 | 7/2010 | Chidlovskii |
| 7,769,772 B2 | 8/2010 | Weyl et al. |
| 7,785,180 B1 | 8/2010 | von Ahn et al. |
| 7,805,398 B1 | 9/2010 | Yang |
| 7,812,986 B2 | 10/2010 | Graham et al. |
| 7,813,581 B1 | 10/2010 | Fitzpatrick et al. |
| 7,814,040 B1 | 10/2010 | Zhang et al. |
| 7,827,242 B2 | 11/2010 | Cohen et al. |
| 7,831,426 B2 | 11/2010 | Bennett |
| 7,836,050 B2 | 11/2010 | Jing et al. |
| 7,860,317 B2 | 12/2010 | Xie et al. |
| 7,860,344 B1 | 12/2010 | Fitzpatrick et al. |
| 7,873,519 B2 | 1/2011 | Bennett |
| 7,873,642 B2 | 1/2011 | Smith et al. |
| 7,877,421 B2 | 1/2011 | Berger et al. |
| 7,885,955 B2 | 2/2011 | Hull et al. |
| 7,890,512 B2 | 2/2011 | Mei et al. |
| 7,907,940 B2 | 3/2011 | Ramer et al. |
| 7,912,458 B2 | 3/2011 | Ramer et al. |
| 7,912,702 B2 | 3/2011 | Bennett |
| 7,917,554 B2 | 3/2011 | Hull et al. |
| 7,920,759 B2 | 4/2011 | Hull et al. |
| 7,921,098 B2 | 4/2011 | Edelstein et al. |
| 7,930,293 B2 | 4/2011 | Fox et al. |

(56) References Cited

U.S. PATENT DOCUMENTS

| | | |
|---|---|---|
| 7,941,009 B2 | 5/2011 | Li et al. |
| 7,953,693 B2 | 5/2011 | Smith et al. |
| 7,958,068 B2 | 6/2011 | Smith et al. |
| 7,958,444 B2 | 6/2011 | Jacquin et al. |
| 7,962,500 B2 | 6/2011 | van Zwol et al. |
| 7,962,503 B2 | 6/2011 | Edelstein et al. |
| 7,970,389 B2 | 6/2011 | Ramer et al. |
| 7,975,215 B2 | 7/2011 | Duncan et al. |
| 7,980,953 B2 | 7/2011 | von Ahn Arellano |
| 7,983,662 B1 | 7/2011 | Ramer et al. |
| 7,986,842 B2 | 7/2011 | Cooper |
| 7,991,778 B2 | 8/2011 | Hull et al. |
| 7,992,215 B2 | 8/2011 | Bartholomew |
| 7,995,090 B2 | 8/2011 | Liu et al. |
| 7,996,762 B2 | 8/2011 | Qi et al. |
| 8,005,281 B2 | 8/2011 | Hamadeh |
| 8,005,831 B2 | 8/2011 | Hull et al. |
| 8,027,879 B2 | 9/2011 | Ramer et al. |
| 8,027,945 B1 | 9/2011 | Elad et al. |
| 8,032,483 B1 | 10/2011 | Haveliwala et al. |
| 8,046,317 B2 | 10/2011 | Dasgupta et al. |
| 8,050,454 B2 | 11/2011 | Yi et al. |
| 8,060,531 B2 | 11/2011 | Edelstein et al. |
| 8,065,313 B2 | 11/2011 | Yagnik |
| 8,068,677 B2 | 11/2011 | Varadarajan et al. |
| 8,069,125 B2 | 11/2011 | Jung et al. |
| 8,081,824 B2 | 12/2011 | Li et al. |
| 8,089,458 B2 | 1/2012 | Barney et al. |
| 8,094,948 B2 | 1/2012 | Jain et al. |
| 8,122,335 B2 | 2/2012 | Duhig et al. |
| 8,126,274 B2 | 2/2012 | Li et al. |
| 8,131,271 B2 | 3/2012 | Ramer et al. |
| 8,131,552 B1 | 3/2012 | Gibbon et al. |
| 8,131,741 B2 | 3/2012 | Jensen et al. |
| 8,135,221 B2 | 3/2012 | Jiang et al. |
| 8,140,973 B2 | 3/2012 | Sandquist et al. |
| 8,150,170 B2 | 4/2012 | Li et al. |
| 8,150,796 B2 | 4/2012 | Jung et al. |
| 8,150,835 B2 | 4/2012 | Boldyrev et al. |
| 8,156,128 B2 | 4/2012 | Ramer et al. |
| 8,156,427 B2 | 4/2012 | Graham et al. |
| 8,164,567 B1 | 4/2012 | Barney et al. |
| 8,165,410 B2 | 4/2012 | Perronnin |
| 8,165,883 B2 | 4/2012 | Galanes et al. |
| 8,169,406 B2 | 5/2012 | Barney et al. |
| 8,170,280 B2 | 5/2012 | Zhao et al. |
| 8,171,043 B2 | 5/2012 | Murdock et al. |
| 8,171,049 B2 | 5/2012 | Ah-Pine et al. |
| 8,175,376 B2 | 5/2012 | Marchesotti et al. |
| 8,175,585 B2 | 5/2012 | Ramer et al. |
| 8,180,332 B2 | 5/2012 | Ramer et al. |
| 8,184,097 B1 | 5/2012 | Barney et al. |
| 8,185,826 B2 | 5/2012 | Farouki |
| 8,189,880 B2 | 5/2012 | Wen et al. |
| 8,190,604 B2 | 5/2012 | Wen et al. |
| 8,194,986 B2 | 6/2012 | Conwell |
| 8,195,133 B2 | 6/2012 | Ramer et al. |
| 8,195,593 B2 | 6/2012 | Jung et al. |
| 8,195,659 B2 | 6/2012 | Hull et al. |
| 8,200,205 B2 | 6/2012 | Ramer et al. |
| 8,204,842 B1 | 6/2012 | Zhang et al. |
| 8,209,344 B2 | 6/2012 | Ramer et al. |
| 8,213,709 B1 | 7/2012 | Medasani et al. |
| 8,214,813 B2 | 7/2012 | Harris et al. |
| 8,218,859 B2 | 7/2012 | Wang et al. |
| 8,224,650 B2 | 7/2012 | Galanes et al. |
| 8,229,222 B1 | 7/2012 | Silver et al. |
| 8,229,734 B2 | 7/2012 | Bennett |
| 8,229,865 B2 | 7/2012 | Campbell et al. |
| 8,229,909 B2 | 7/2012 | Wang et al. |
| 8,229,914 B2 | 7/2012 | Ramer et al. |
| 8,232,996 B2 | 7/2012 | Bailloeul et al. |
| 8,238,888 B2 | 8/2012 | Ramer et al. |
| 8,239,333 B2 | 8/2012 | Yang et al. |
| 8,239,455 B2 | 8/2012 | Wang |
| 8,244,041 B1 | 8/2012 | Silver et al. |
| 8,248,367 B1 | 8/2012 | Barney et al. |
| 8,249,362 B1 | 8/2012 | Silver et al. |
| 8,254,695 B1 | 8/2012 | Silver et al. |
| 8,260,689 B2 | 9/2012 | Dollens |
| 8,265,395 B1 | 9/2012 | Silver et al. |
| 8,266,148 B2 | 9/2012 | Guha et al. |
| 8,270,748 B1 | 9/2012 | Silver et al. |
| 8,270,955 B2 | 9/2012 | Ramer et al. |
| 8,275,834 B2 | 9/2012 | Aldunate et al. |
| 8,280,904 B2 | 10/2012 | Bartholomew |
| 8,290,810 B2 | 10/2012 | Ramer et al. |
| 8,295,613 B1 | 10/2012 | Silver et al. |
| 8,296,297 B2 | 10/2012 | Green et al. |
| 8,301,125 B2 | 10/2012 | Ramer et al. |
| 8,301,622 B2 | 10/2012 | Green et al. |
| 8,311,344 B2 | 11/2012 | Dunlop et al. |
| 8,311,390 B2 | 11/2012 | Berry |
| 8,311,835 B2 | 11/2012 | Lecoeuche |
| 8,311,888 B2 | 11/2012 | Ramer et al. |
| 8,312,381 B2 | 11/2012 | Jorasch et al. |
| 8,316,000 B2 | 11/2012 | Srivastava et al. |
| 8,320,675 B1 | 11/2012 | Silver et al. |
| 8,321,424 B2 | 11/2012 | Li et al. |
| 8,331,673 B1 | 12/2012 | Silver et al. |
| 8,332,401 B2 | 12/2012 | Hull et al. |
| 8,335,380 B1 | 12/2012 | Silver et al. |
| 8,335,789 B2 | 12/2012 | Hull et al. |
| 8,341,112 B2 | 12/2012 | Zhang et al. |
| 8,345,979 B2 | 1/2013 | Davis |
| 8,346,685 B1 | 1/2013 | Ravid |
| 8,351,661 B2 | 1/2013 | Begeja et al. |
| 8,352,277 B2 | 1/2013 | Bennett |
| 8,356,004 B2 | 1/2013 | Jung et al. |
| 8,359,019 B2 | 1/2013 | Ramer et al. |
| 8,363,942 B1 | 1/2013 | Silver et al. |
| 8,363,956 B1 | 1/2013 | Silver et al. |
| 8,363,972 B1 | 1/2013 | Silver et al. |
| 8,364,673 B2 | 1/2013 | Chang et al. |
| 8,368,648 B2 | 2/2013 | Barney et al. |
| 8,370,869 B2 | 2/2013 | Paek et al. |
| 8,373,659 B2 | 2/2013 | Barney et al. |
| 8,379,990 B2 | 2/2013 | Nitta |
| 8,380,039 B2 | 2/2013 | Luo et al. |
| 8,380,045 B2 | 2/2013 | Berry et al. |
| 8,384,668 B2 | 2/2013 | Barney et al. |
| 8,386,475 B2 | 2/2013 | Green et al. |
| 8,391,618 B1 | 3/2013 | Chuang et al. |
| 8,396,286 B1 | 3/2013 | Aradhye et al. |
| 8,396,876 B2 | 3/2013 | Kennedy et al. |
| 8,412,746 B2 | 4/2013 | Fox et al. |
| 8,422,832 B2 | 4/2013 | Makadia et al. |
| 8,423,503 B2 | 4/2013 | Feng et al. |
| 8,428,340 B2 | 4/2013 | Marais et al. |
| 8,429,174 B2 | 4/2013 | Ramani et al. |
| 8,433,297 B2 | 4/2013 | Ramer et al. |
| 8,447,767 B2 | 5/2013 | Ah-Pine et al. |
| 8,452,778 B1 | 5/2013 | Song et al. |
| 8,452,794 B2 | 5/2013 | Yang et al. |
| 8,457,416 B2 | 6/2013 | Liu et al. |
| 8,457,607 B2 | 6/2013 | Ramer et al. |
| 8,457,959 B2 | 6/2013 | Kaiser |
| 8,462,176 B1 | 6/2013 | Stubbs et al. |
| 8,463,035 B2 | 6/2013 | Bechtel et al. |
| 8,463,045 B2 | 6/2013 | Yang et al. |
| 8,463,053 B1 | 6/2013 | Guo et al. |
| 8,463,249 B2 | 6/2013 | Ramer et al. |
| 8,463,768 B2 | 6/2013 | Srivastava et al. |
| 8,467,774 B2 | 6/2013 | Ramer et al. |
| 8,475,275 B2 | 7/2013 | Weston et al. |
| 8,477,994 B1 | 7/2013 | Noshadi |
| 8,478,052 B1 | 7/2013 | Yee et al. |
| 8,483,671 B2 | 7/2013 | Ramer et al. |
| 8,483,674 B2 | 7/2013 | Ramer et al. |
| 8,484,234 B2 | 7/2013 | Ramer et al. |
| 8,488,682 B2 | 7/2013 | Chang et al. |
| 8,489,077 B2 | 7/2013 | Ramer et al. |
| 8,489,115 B2 | 7/2013 | Rodriguez et al. |
| 8,489,589 B2 | 7/2013 | Mei et al. |

(56) References Cited

U.S. PATENT DOCUMENTS

| | | |
|---|---|---|
| 8,491,389 B2 | 7/2013 | Weston et al. |
| 8,494,238 B2 | 7/2013 | Zhou |
| 8,494,500 B2 | 7/2013 | Ramer et al. |
| 8,503,791 B2 | 8/2013 | Conwell |
| 8,503,995 B2 | 8/2013 | Ramer et al. |
| 8,504,570 B2 | 8/2013 | Hawkins et al. |
| 8,509,750 B2 | 8/2013 | Ramer et al. |
| 8,515,160 B1 | 8/2013 | Khosla et al. |
| 8,515,171 B2 | 8/2013 | Vantaram et al. |
| 8,515,212 B1 | 8/2013 | Bengio et al. |
| 8,515,400 B2 | 8/2013 | Ramer et al. |
| 8,515,401 B2 | 8/2013 | Ramer et al. |
| 8,516,374 B2 | 8/2013 | Fleischman et al. |
| 8,520,979 B2 | 8/2013 | Conwell |
| 8,521,737 B2 | 8/2013 | Hart et al. |
| 8,527,432 B1 | 9/2013 | Guo et al. |
| 8,527,523 B1 | 9/2013 | Ravid |
| 8,527,564 B2 | 9/2013 | Van Zwol et al. |
| 8,528,019 B1 | 9/2013 | Dimitrova et al. |
| 8,532,377 B2 | 9/2013 | Skaff et al. |
| 8,532,633 B2 | 9/2013 | Ramer et al. |
| 8,532,634 B2 | 9/2013 | Ramer et al. |
| 8,533,134 B1 | 9/2013 | Zhao et al. |
| 8,533,194 B1 | 9/2013 | Ravid et al. |
| 8,538,173 B2 | 9/2013 | Fukui et al. |
| 8,538,896 B2 | 9/2013 | Mensink et al. |
| 8,539,336 B2 | 9/2013 | Griffiths et al. |
| 8,543,421 B2 | 9/2013 | Menschik et al. |
| 8,543,454 B2 | 9/2013 | Fleischman et al. |
| 8,543,521 B2 | 9/2013 | Yang et al. |
| 8,543,598 B2 | 9/2013 | Udupa et al. |
| 8,548,938 B2 | 10/2013 | Amaru et al. |
| 8,553,045 B2 | 10/2013 | Skaff et al. |
| 8,554,192 B2 | 10/2013 | Ramer et al. |
| 8,554,639 B2 | 10/2013 | Dollens |
| 8,559,682 B2 | 10/2013 | Zhang et al. |
| 8,559,731 B2 | 10/2013 | Mass et al. |
| 8,560,517 B2 | 10/2013 | Yang et al. |
| 8,571,850 B2 | 10/2013 | Li et al. |
| 8,583,089 B2 | 11/2013 | Ramer et al. |
| 8,583,263 B2 | 11/2013 | Hoffberg et al. |
| 8,583,418 B2 | 11/2013 | Silverman et al. |
| 8,589,315 B2 | 11/2013 | Medasani et al. |
| 8,594,468 B2 | 11/2013 | Li et al. |
| 8,600,743 B2 | 12/2013 | Lindahl et al. |
| 8,600,830 B2 | 12/2013 | Hoffberg |
| 8,600,989 B2 | 12/2013 | Hull et al. |
| 8,606,021 B2 | 12/2013 | Conwell |
| 8,606,745 B1 | 12/2013 | Haveliwala et al. |
| 8,606,780 B2 | 12/2013 | Hu et al. |
| 8,611,677 B2 | 12/2013 | Das et al. |
| 8,612,259 B2 | 12/2013 | Menschik et al. |
| 8,612,373 B2 | 12/2013 | Chidlovskii |
| 8,614,431 B2 | 12/2013 | Huppi et al. |
| 8,615,412 B2 | 12/2013 | Menschik et al. |
| 8,615,479 B2 | 12/2013 | Jung et al. |
| 8,620,285 B2 | 12/2013 | Ramer et al. |
| 8,620,662 B2 | 12/2013 | Bellegarda |
| 8,620,912 B2 | 12/2013 | Wang et al. |
| 8,625,887 B2 | 1/2014 | Li et al. |
| 8,625,904 B2 | 1/2014 | Das et al. |
| 8,630,975 B1 | 1/2014 | Guo et al. |
| 8,634,662 B2 | 1/2014 | Das et al. |
| 8,645,123 B2 | 2/2014 | Hua et al. |
| 8,645,137 B2 | 2/2014 | Bellegarda et al. |
| 8,645,287 B2 | 2/2014 | Baker et al. |
| 8,645,291 B2 | 2/2014 | Hawkins et al. |
| 8,650,636 B2 | 2/2014 | Johnson et al. |
| 8,654,255 B2 | 2/2014 | Hua et al. |
| 8,655,891 B2 | 2/2014 | Ramer et al. |
| 8,660,849 B2 | 2/2014 | Gruber et al. |
| 8,660,891 B2 | 2/2014 | Ramer et al. |
| 8,666,376 B2 | 3/2014 | Ramer et al. |
| 8,670,979 B2 | 3/2014 | Gruber et al. |
| 8,670,985 B2 | 3/2014 | Lindahl et al. |
| 8,671,069 B2 | 3/2014 | Chang et al. |
| 8,676,835 B2 | 3/2014 | Bartholomew |
| 8,676,904 B2 | 3/2014 | Lindahl |
| 8,677,377 B2 | 3/2014 | Cheyer et al. |
| 8,682,649 B2 | 3/2014 | Bellegarda |
| 8,682,667 B2 | 3/2014 | Haughay |
| 8,686,579 B2 | 4/2014 | Barney et al. |
| 8,688,088 B2 | 4/2014 | Ramer et al. |
| 8,688,446 B2 | 4/2014 | Yanagihara |
| 8,688,671 B2 | 4/2014 | Ramer et al. |
| 8,694,459 B2 | 4/2014 | Zadeh |
| 8,706,472 B2 | 4/2014 | Ramerth et al. |
| 8,706,503 B2 | 4/2014 | Cheyer et al. |
| 8,706,674 B2 | 4/2014 | Yang et al. |
| 8,711,094 B2 | 4/2014 | Barney et al. |
| 8,712,395 B2 | 4/2014 | Ramer et al. |
| 8,712,776 B2 | 4/2014 | Bellegarda et al. |
| 8,713,021 B2 | 4/2014 | Bellegarda |
| 8,713,119 B2 | 4/2014 | Lindahl |
| 8,718,047 B2 | 5/2014 | Vieri et al. |
| 8,718,363 B2 | 5/2014 | Desai et al. |
| 8,718,617 B2 | 5/2014 | Ramer et al. |
| 8,719,006 B2 | 5/2014 | Bellegarda |
| 8,719,014 B2 | 5/2014 | Wagner |
| 8,724,909 B2 | 5/2014 | Quack |
| 8,725,126 B2 | 5/2014 | Ramer et al. |
| 8,725,513 B2 | 5/2014 | Cross, Jr. et al. |
| 8,726,144 B2 | 5/2014 | Chidlovskii et al. |
| 8,731,308 B2 | 5/2014 | Fry et al. |
| 8,731,942 B2 | 5/2014 | Cheyer et al. |
| 8,732,161 B2 | 5/2014 | Jain et al. |
| 8,737,703 B2 | 5/2014 | Mangoubi et al. |
| 8,737,972 B2 | 5/2014 | Ramer et al. |
| 8,738,396 B2 | 5/2014 | Green, III et al. |
| 8,745,541 B2 | 6/2014 | Wilson et al. |
| 8,750,629 B2 | 6/2014 | Ma et al. |
| 8,751,238 B2 | 6/2014 | James et al. |
| 8,752,011 B2 | 6/2014 | Dewan et al. |
| 8,755,596 B2 | 6/2014 | Datta et al. |
| 8,755,776 B2 | 6/2014 | Ramer et al. |
| 8,755,837 B2 | 6/2014 | Rhoads et al. |
| 8,762,152 B2 | 6/2014 | Bennett et al. |
| 8,762,156 B2 | 6/2014 | Chen |
| 8,762,305 B1 | 6/2014 | Chelian et al. |
| 8,762,469 B2 | 6/2014 | Lindahl |
| 8,768,319 B2 | 7/2014 | Ramer et al. |
| 8,768,702 B2 | 7/2014 | Mason et al. |
| 8,769,420 B2 | 7/2014 | Jorasch et al. |
| 8,774,498 B2 | 7/2014 | de Campos et al. |
| 8,774,515 B2 | 7/2014 | Mensink et al. |
| 8,774,777 B2 | 7/2014 | Ramer et al. |
| 8,775,424 B2 | 7/2014 | Skaff et al. |
| 8,775,442 B2 | 7/2014 | Moore et al. |
| 8,781,179 B2 | 7/2014 | Begeja et al. |
| 8,781,231 B1 | 7/2014 | Kumar et al. |
| 8,781,836 B2 | 7/2014 | Foo et al. |
| 8,787,683 B1 | 7/2014 | Yee et al. |
| 8,788,434 B2 | 7/2014 | Makadia et al. |
| 8,790,180 B2 | 7/2014 | Barney et al. |
| 8,792,732 B1 | 7/2014 | Zhao et al. |
| 8,798,592 B2 | 8/2014 | Ramer et al. |
| 8,798,594 B2 | 8/2014 | Ramer et al. |
| 8,798,595 B2 | 8/2014 | Ramer et al. |
| 8,799,000 B2 | 8/2014 | Guzzoni et al. |
| 8,805,165 B2 | 8/2014 | Luo et al. |
| 8,805,339 B2 | 8/2014 | Ramer et al. |
| 8,811,755 B2 | 8/2014 | Das et al. |
| 8,812,294 B2 | 8/2014 | Kalb et al. |
| 8,812,526 B2 | 8/2014 | Ramer et al. |
| 8,814,688 B2 | 8/2014 | Barney et al. |
| 8,818,984 B2 | 8/2014 | Srivastava et al. |
| 8,819,024 B1 | 8/2014 | Toderici et al. |
| 8,819,659 B2 | 8/2014 | Ramer et al. |
| 8,825,472 B2 | 9/2014 | Raghuveer |
| 8,825,565 B2 | 9/2014 | Marianetti, II et al. |
| 8,825,744 B2 | 9/2014 | Wang et al. |
| 8,832,100 B2 | 9/2014 | Ramer et al. |
| 8,838,432 B2 | 9/2014 | Baker et al. |
| 8,838,591 B2 | 9/2014 | Hull et al. |

(56) References Cited

U.S. PATENT DOCUMENTS

| | | |
|---|---|---|
| 8,843,395 B2 | 9/2014 | Ramer et al. |
| 8,843,396 B2 | 9/2014 | Ramer et al. |
| 8,849,058 B2 | 9/2014 | Kennedy et al. |
| 8,855,372 B2 | 10/2014 | Rodriguez et al. |
| 8,855,430 B1 | 10/2014 | Alldrin et al. |
| 8,856,051 B1 | 10/2014 | Song et al. |
| 8,862,252 B2 | 10/2014 | Rottler et al. |
| 8,863,619 B2 | 10/2014 | Frank et al. |
| 8,868,437 B2 | 10/2014 | Menschik et al. |
| 8,869,174 B2 | 10/2014 | Wong |
| 8,873,853 B2 | 10/2014 | Rodriguez |
| 8,874,453 B2 | 10/2014 | Menschik et al. |
| 8,874,477 B2 | 10/2014 | Hoffberg |
| 8,880,444 B2 | 11/2014 | Loui et al. |
| 8,880,571 B2 | 11/2014 | Srinivasan et al. |
| 8,880,606 B2 | 11/2014 | Aldunate et al. |
| 8,886,222 B1 | 11/2014 | Rodriguez et al. |
| 8,886,576 B1 | 11/2014 | Sanketi et al. |
| 8,886,581 B2 | 11/2014 | Frank et al. |
| 8,892,446 B2 | 11/2014 | Cheyer et al. |
| 8,892,488 B2 | 11/2014 | Qi et al. |
| 8,898,091 B2 | 11/2014 | Frank et al. |
| 8,898,558 B2 | 11/2014 | Jain et al. |
| 8,898,568 B2 | 11/2014 | Bull et al. |
| 8,902,252 B2 | 12/2014 | Rakshit |
| 8,903,716 B2 | 12/2014 | Chen et al. |
| 8,903,798 B2 | 12/2014 | El-Saban et al. |
| 8,909,563 B1 | 12/2014 | Jing et al. |
| 8,910,253 B2 | 12/2014 | Johnson et al. |
| 8,913,011 B2 | 12/2014 | Barney et al. |
| 8,914,376 B2 | 12/2014 | Ravid |
| 8,915,785 B2 | 12/2014 | Barney et al. |
| 8,918,344 B2 | 12/2014 | Frank et al. |
| 8,923,630 B2 | 12/2014 | Guo et al. |
| 8,923,655 B1 | 12/2014 | Weston et al. |
| 8,924,269 B2 | 12/2014 | Seubert et al. |
| 8,924,993 B1 | 12/2014 | Niebles Duque et al. |
| 8,930,191 B2 | 1/2015 | Gruber et al. |
| 8,930,304 B2 | 1/2015 | Guo et al. |
| 8,934,666 B2 | 1/2015 | Luke et al. |
| 8,935,167 B2 | 1/2015 | Bellegarda |
| 8,935,196 B2 | 1/2015 | Zillner |
| 8,935,246 B2 | 1/2015 | Bengio et al. |
| 8,938,403 B2 | 1/2015 | Frank et al. |
| 8,942,917 B2 | 1/2015 | Chrysanthakopoulos |
| 8,942,986 B2 | 1/2015 | Cheyer et al. |
| 8,949,170 B2 | 2/2015 | Zadeh |
| 8,949,287 B2 | 2/2015 | Hull et al. |
| 8,954,358 B1 | 2/2015 | Zhang et al. |
| 8,958,779 B2 | 2/2015 | Ramer et al. |
| 8,961,312 B2 | 2/2015 | Barney et al. |
| 8,965,822 B2 | 2/2015 | Frank et al. |
| 8,971,644 B1 | 3/2015 | Jing et al. |
| 8,977,041 B2 | 3/2015 | Lu et al. |
| 8,977,255 B2 | 3/2015 | Freeman et al. |
| 8,977,293 B2 | 3/2015 | Rodriguez et al. |
| 8,983,192 B2 | 3/2015 | Sukthankar et al. |
| 8,989,718 B2 | 3/2015 | Ramer et al. |
| 8,990,128 B2 | 3/2015 | He et al. |
| 8,990,134 B1 | 3/2015 | Snoek et al. |
| 8,995,968 B2 | 3/2015 | Ramer et al. |
| 8,995,973 B2 | 3/2015 | Ramer et al. |
| 8,996,350 B1 | 3/2015 | Dub et al. |
| 8,996,376 B2 | 3/2015 | Fleizach et al. |
| 9,002,120 B2 | 4/2015 | Fry et al. |
| 9,002,842 B2 | 4/2015 | Ravid |
| 9,008,429 B2 | 4/2015 | Rodriguez-Serrano et al. |
| 9,008,489 B2 | 4/2015 | Nakazawa et al. |
| 9,009,054 B2 | 4/2015 | Liu et al. |
| 9,015,084 B2 | 4/2015 | Thieberger et al. |
| 9,020,212 B2 | 4/2015 | Zhang et al. |
| 9,020,263 B2 | 4/2015 | Dunlop et al. |
| 9,021,373 B2 | 4/2015 | Jorasch et al. |
| 9,032,110 B2 | 5/2015 | Frank et al. |
| 9,039,533 B2 | 5/2015 | Barney et al. |
| 9,042,646 B2 | 5/2015 | Das et al. |
| 9,053,089 B2 | 6/2015 | Bellegarda |
| 9,058,200 B2 | 6/2015 | Frank et al. |
| 9,058,406 B2 | 6/2015 | Soroca et al. |
| 9,060,175 B2 | 6/2015 | Wang et al. |
| 9,063,930 B2 | 6/2015 | Zadeh |
| 9,063,953 B2 | 6/2015 | Hull et al. |
| 9,064,009 B2 | 6/2015 | Ghosh et al. |
| 9,075,783 B2 | 7/2015 | Wagner |
| 9,075,824 B2 | 7/2015 | Gordo et al. |
| 9,075,825 B2 | 7/2015 | Chen et al. |
| 9,076,108 B2 | 7/2015 | Frank et al. |
| 9,076,175 B2 | 7/2015 | Ramer et al. |
| 9,076,448 B2 | 7/2015 | Bennett et al. |
| 9,086,884 B1 | 7/2015 | Frank et al. |
| 9,087,059 B2 | 7/2015 | Petrou et al. |
| 9,087,111 B2 | 7/2015 | Mass et al. |
| 9,094,616 B2 | 7/2015 | Rime et al. |
| 9,098,532 B2 | 8/2015 | Cragun et al. |
| 9,098,584 B1 | 8/2015 | Fredinburg et al. |
| 9,110,922 B2 | 8/2015 | Bengio et al. |
| 9,111,146 B2 | 8/2015 | Dunlop et al. |
| 9,116,981 B2 | 8/2015 | Denney et al. |
| 9,117,146 B2 | 8/2015 | Li et al. |
| 9,122,955 B2 | 9/2015 | Greenspan et al. |
| 9,129,227 B1 | 9/2015 | Yee et al. |
| 9,135,277 B2 | 9/2015 | Petrou |
| 9,143,603 B2 | 9/2015 | Davis et al. |
| 9,146,941 B2 | 9/2015 | Lin et al. |
| 9,165,217 B2 | 10/2015 | Cao et al. |
| 9,171,068 B2 | 10/2015 | Xu |
| 9,171,202 B2 | 10/2015 | Hull et al. |
| 9,171,261 B1 | 10/2015 | Ladeh |
| 9,176,988 B2 | 11/2015 | Bengio et al. |
| 9,183,226 B2 | 11/2015 | Yee et al. |
| 9,183,227 B2 | 11/2015 | Clinchant et al. |
| 9,183,604 B2 | 11/2015 | Lauper et al. |
| 9,189,735 B2 | 11/2015 | Ni et al. |
| 9,190,026 B2 | 11/2015 | Yang et al. |
| 9,197,736 B2 | 11/2015 | Davis et al. |
| 9,223,769 B2 | 12/2015 | Tsibulevskiy et al. |
| 9,229,956 B2 | 1/2016 | Ke et al. |
| 9,232,205 B2 | 1/2016 | Suzuki et al. |
| 9,237,263 B2 | 1/2016 | Rime et al. |
| 9,239,848 B2 | 1/2016 | Liu et al. |
| 9,245,043 B2 | 1/2016 | Liu et al. |
| 9,251,473 B2 | 2/2016 | Gamon et al. |
| 2002/0029232 A1 | 3/2002 | Bobrow et al. |
| 2002/0070970 A1 | 6/2002 | Wood et al. |
| 2002/0082850 A1 | 6/2002 | Panelli |
| 2002/0161747 A1 | 10/2002 | Li et al. |
| 2002/0163532 A1 | 11/2002 | Thomas et al. |
| 2002/0184196 A1 | 12/2002 | Lehmeier et al. |
| 2002/0188602 A1 | 12/2002 | Stubler et al. |
| 2003/0041047 A1 | 2/2003 | Chang et al. |
| 2003/0050927 A1 | 3/2003 | Hussam |
| 2003/0053686 A1 | 3/2003 | Luo et al. |
| 2003/0095697 A1 | 5/2003 | Wood et al. |
| 2003/0101104 A1 | 5/2003 | Dimitrova et al. |
| 2003/0105589 A1 | 6/2003 | Liu et al. |
| 2003/0107592 A1 | 6/2003 | Li et al. |
| 2003/0108250 A1 | 6/2003 | Luo et al. |
| 2003/0108334 A1 | 6/2003 | Nevenka et al. |
| 2003/0187844 A1 | 10/2003 | Li et al. |
| 2004/0215663 A1 | 10/2004 | Liu et al. |
| 2004/0220925 A1 | 11/2004 | Liu et al. |
| 2005/0010553 A1 | 1/2005 | Liu |
| 2005/0114325 A1 | 5/2005 | Liu et al. |
| 2005/0147298 A1 | 7/2005 | Gallagher et al. |
| 2005/0165763 A1 | 7/2005 | Li et al. |
| 2005/0235272 A1 | 10/2005 | Skinner |
| 2006/0056670 A1 | 3/2006 | Hamadeh |
| 2006/0262352 A1 | 11/2006 | Hull et al. |
| 2006/0262962 A1 | 11/2006 | Hull et al. |
| 2006/0262976 A1 | 11/2006 | Hart et al. |
| 2006/0285172 A1 | 12/2006 | Hull et al. |
| 2006/0285772 A1 | 12/2006 | Hull et al. |
| 2007/0003124 A1 | 1/2007 | Wood et al. |
| 2007/0046982 A1 | 3/2007 | Hull et al. |

(56) References Cited

U.S. PATENT DOCUMENTS

| | | |
|---|---|---|
| 2007/0046983 A1 | 3/2007 | Hull et al. |
| 2007/0047002 A1 | 3/2007 | Hull et al. |
| 2007/0047008 A1 | 3/2007 | Graham et al. |
| 2007/0047780 A1 | 3/2007 | Hull et al. |
| 2007/0047781 A1 | 3/2007 | Hull et al. |
| 2007/0047782 A1 | 3/2007 | Hull et al. |
| 2007/0047816 A1 | 3/2007 | Graham et al. |
| 2007/0047818 A1 | 3/2007 | Hull et al. |
| 2007/0047819 A1 | 3/2007 | Hull et al. |
| 2007/0050341 A1 | 3/2007 | Hull et al. |
| 2007/0050360 A1 | 3/2007 | Hull et al. |
| 2007/0050411 A1 | 3/2007 | Hull et al. |
| 2007/0050419 A1 | 3/2007 | Weyl et al. |
| 2007/0050712 A1 | 3/2007 | Hull et al. |
| 2007/0052997 A1 | 3/2007 | Hull et al. |
| 2007/0073704 A1 | 3/2007 | Bowden et al. |
| 2007/0115373 A1 | 5/2007 | Gallagher et al. |
| 2007/0118399 A1 | 5/2007 | Avinash et al. |
| 2007/0165904 A1 | 7/2007 | Nudd et al. |
| 2007/0258641 A1 | 11/2007 | Srinivasan et al. |
| 2008/0021928 A1 | 1/2008 | Yagnik |
| 2008/0027917 A1 | 1/2008 | Mukherjee et al. |
| 2008/0027933 A1 | 1/2008 | Hussam |
| 2008/0285860 A1 | 11/2008 | Datta et al. |
| 2008/0292196 A1 | 11/2008 | Jain et al. |
| 2008/0313214 A1 | 12/2008 | Duhig et al. |
| 2009/0016581 A1 | 1/2009 | Hamadeh |
| 2009/0063455 A1 | 3/2009 | Li et al. |
| 2009/0070350 A1 | 3/2009 | Wang |
| 2009/0074306 A1 | 3/2009 | Liu et al. |
| 2009/0076800 A1 | 3/2009 | Li et al. |
| 2009/0083010 A1 | 3/2009 | Qi et al. |
| 2009/0083332 A1 | 3/2009 | Datta et al. |
| 2009/0157571 A1 | 6/2009 | Smith et al. |
| 2009/0171961 A1 | 7/2009 | Fredrickson |
| 2009/0198685 A1 | 8/2009 | Bartholomew |
| 2009/0204637 A1 | 8/2009 | Li et al. |
| 2009/0208106 A1 | 8/2009 | Dunlop et al. |
| 2009/0297050 A1 | 12/2009 | Li et al. |
| 2009/0304272 A1 | 12/2009 | Makadia et al. |
| 2009/0307215 A1 | 12/2009 | Ball et al. |
| 2009/0313245 A1 | 12/2009 | Weyl et al. |
| 2009/0313294 A1 | 12/2009 | Mei et al. |
| 2009/0327857 A1 | 12/2009 | Hemmeryckx-Deleersnijder et al. |
| 2010/0083153 A1 | 4/2010 | Jain et al. |
| 2010/0106486 A1 | 4/2010 | Hua et al. |
| 2010/0114888 A1 | 5/2010 | van Zwol et al. |
| 2010/0124378 A1 | 5/2010 | Das et al. |
| 2010/0166309 A1 | 7/2010 | Hull et al. |
| 2010/0189354 A1 | 7/2010 | de Campos et al. |
| 2010/0211617 A1 | 8/2010 | Jain et al. |
| 2010/0226564 A1 | 9/2010 | Marchesotti et al. |
| 2010/0226582 A1 | 9/2010 | Luo et al. |
| 2011/0055266 A1 | 3/2011 | Varadarajan et al. |
| 2011/0081082 A1 | 4/2011 | Jiang et al. |
| 2011/0081892 A1 | 4/2011 | Graham et al. |
| 2011/0123120 A1 | 5/2011 | Quack |
| 2011/0125614 A1 | 5/2011 | Dollens |
| 2011/0154174 A1 | 6/2011 | Liu et al. |
| 2011/0173141 A1 | 7/2011 | Campbell et al. |
| 2011/0182493 A1 | 7/2011 | Huber et al. |
| 2011/0188706 A1 | 8/2011 | Zhou |
| 2011/0191374 A1 | 8/2011 | Bengio et al. |
| 2011/0200230 A1 | 8/2011 | Luke et al. |
| 2011/0219087 A1 | 9/2011 | Jorasch et al. |
| 2011/0239132 A1 | 9/2011 | Jorasch et al. |
| 2011/0246514 A1 | 10/2011 | Bartholomew |
| 2011/0295790 A1 | 12/2011 | Diner |
| 2011/0314367 A1 | 12/2011 | Chang et al. |
| 2012/0020576 A1 | 1/2012 | Fry et al. |
| 2012/0039527 A1 | 2/2012 | Qi et al. |
| 2012/0051644 A1 | 3/2012 | Das et al. |
| 2012/0054130 A1 | 3/2012 | Mensink et al. |
| 2012/0069051 A1 | 3/2012 | Hagbi et al. |
| 2012/0082371 A1 | 4/2012 | Bengio et al. |
| 2012/0086982 A1 | 4/2012 | Graham et al. |
| 2012/0089552 A1 | 4/2012 | Chang et al. |
| 2012/0094258 A1 | 4/2012 | Langheier et al. |
| 2012/0113121 A1 | 5/2012 | Luo et al. |
| 2012/0114257 A1 | 5/2012 | Fry et al. |
| 2012/0114296 A1 | 5/2012 | Luo et al. |
| 2012/0114307 A1 | 5/2012 | Yang et al. |
| 2012/0155774 A1 | 6/2012 | Li et al. |
| 2012/0158716 A1 | 6/2012 | Zwol et al. |
| 2012/0158739 A1 | 6/2012 | Ah-Pine et al. |
| 2012/0179704 A1 | 7/2012 | Xu et al. |
| 2012/0210204 A1 | 8/2012 | Kramer et al. |
| 2012/0233531 A1 | 9/2012 | Ma et al. |
| 2012/0269436 A1 | 10/2012 | Mensink et al. |
| 2012/0283574 A1 | 11/2012 | Park et al. |
| 2012/0290621 A1 | 11/2012 | Heitz et al. |
| 2012/0330963 A1 | 12/2012 | Bartholomew |
| 2013/0011070 A1 | 1/2013 | Datta et al. |
| 2013/0013591 A1 | 1/2013 | Hu et al. |
| 2013/0031449 A1 | 1/2013 | Griffiths et al. |
| 2013/0031453 A1 | 1/2013 | Griffiths et al. |
| 2013/0031454 A1 | 1/2013 | Griffiths et al. |
| 2013/0031455 A1 | 1/2013 | Griffiths et al. |
| 2013/0031457 A1 | 1/2013 | Griffiths et al. |
| 2013/0036429 A1 | 2/2013 | Lee |
| 2013/0051670 A1 | 2/2013 | Das et al. |
| 2013/0079990 A1 | 3/2013 | Fritsch et al. |
| 2013/0080426 A1 | 3/2013 | Chen et al. |
| 2013/0129252 A1 | 5/2013 | Lauper et al. |
| 2013/0145269 A1 | 6/2013 | Latulipe et al. |
| 2013/0155088 A1 | 6/2013 | Wang et al. |
| 2013/0163860 A1 | 6/2013 | Suzuki et al. |
| 2013/0170738 A1 | 7/2013 | Capuozzo et al. |
| 2013/0183022 A1 | 7/2013 | Suzuki et al. |
| 2013/0198601 A1 | 8/2013 | Makadia et al. |
| 2013/0202205 A1 | 8/2013 | Liu et al. |
| 2013/0251248 A1 | 9/2013 | Guo et al. |
| 2013/0259375 A1 | 10/2013 | Dunlop et al. |
| 2013/0259390 A1 | 10/2013 | Dunlop et al. |
| 2013/0282687 A1 | 10/2013 | Ah-Pine et al. |
| 2013/0290222 A1 | 10/2013 | Gordo et al. |
| 2013/0330008 A1 | 12/2013 | Ladeh |
| 2014/0006526 A1 | 1/2014 | Jorasch et al. |
| 2014/0037195 A1 | 2/2014 | Lin et al. |
| 2014/0046914 A1 | 2/2014 | Das et al. |
| 2014/0052549 A1 | 2/2014 | Dollens |
| 2014/0093174 A1 | 4/2014 | Zhang et al. |
| 2014/0098191 A1 | 4/2014 | Rime et al. |
| 2014/0104441 A1 | 4/2014 | Rime et al. |
| 2014/0105492 A1 | 4/2014 | Das et al. |
| 2014/0108302 A1 | 4/2014 | Chang et al. |
| 2014/0111516 A1 | 4/2014 | Hall et al. |
| 2014/0119652 A1 | 5/2014 | Das et al. |
| 2014/0143251 A1 | 5/2014 | Wang et al. |
| 2014/0143257 A1 | 5/2014 | Bartholomew |
| 2014/0157288 A1 | 6/2014 | Wang |
| 2014/0172764 A1 | 6/2014 | Ni et al. |
| 2014/0181171 A1 | 6/2014 | Dourbal |
| 2014/0181630 A1 | 6/2014 | Monney et al. |
| 2014/0188462 A1 | 7/2014 | Zadeh |
| 2014/0188780 A1 | 7/2014 | Guo et al. |
| 2014/0201126 A1 | 7/2014 | Ladeh et al. |
| 2014/0207781 A1 | 7/2014 | Quack |
| 2014/0250198 A1 | 9/2014 | Jorasch et al. |
| 2014/0267301 A1 | 9/2014 | Yang et al. |
| 2014/0270347 A1 | 9/2014 | Xu et al. |
| 2014/0304622 A1 | 10/2014 | Jorasch et al. |
| 2014/0307958 A1 | 10/2014 | Wang et al. |
| 2014/0321746 A9 | 10/2014 | Dunlop et al. |
| 2014/0344306 A1 | 11/2014 | Bowden et al. |
| 2014/0376804 A1 | 12/2014 | Akata et al. |
| 2015/0058348 A1 | 2/2015 | Cao et al. |
| 2015/0100892 A1 | 4/2015 | Cronin et al. |
| 2015/0100893 A1 | 4/2015 | Cronin et al. |
| 2015/0120760 A1 | 4/2015 | Wang et al. |
| 2015/0142708 A1 | 5/2015 | Jing et al. |
| 2015/0146032 A1 | 5/2015 | Rime et al. |
| 2015/0149155 A1 | 5/2015 | Zadeh |

(56) References Cited

U.S. PATENT DOCUMENTS

| | | |
|---|---|---|
| 2015/0154229 A1 | 6/2015 | An et al. |
| 2015/0161169 A1 | 6/2015 | Fry et al. |
| 2015/0169641 A1 | 6/2015 | Alldrin et al. |
| 2015/0186423 A1 | 7/2015 | Guo et al. |
| 2015/0186789 A1 | 7/2015 | Guo et al. |
| 2015/0189239 A1 | 7/2015 | Zhao et al. |
| 2015/0206169 A1 | 7/2015 | Ye et al. |
| 2015/0206319 A1 | 7/2015 | Dollar et al. |
| 2015/0229996 A1 | 8/2015 | Jo |
| 2015/0235007 A1 | 8/2015 | Peters et al. |
| 2015/0235160 A1 | 8/2015 | Larlus-Larrondo et al. |
| 2015/0242708 A1 | 8/2015 | Duan et al. |
| 2015/0243276 A1 | 8/2015 | Cooper et al. |
| 2015/0262037 A1 | 9/2015 | Li et al. |
| 2015/0269439 A1 | 9/2015 | Versace et al. |
| 2015/0310301 A1 | 10/2015 | Zadeh |
| 2015/0339380 A1 | 11/2015 | Zhang et al. |
| 2015/0356354 A1 | 12/2015 | Dunlop et al. |
| 2015/0363409 A1 | 12/2015 | Wood et al. |
| 2015/0379043 A1 | 12/2015 | Hull et al. |

OTHER PUBLICATIONS

Taskar, Learning Structured Prediction Models: A Large Margin Approach, 2005 [retrieved Jul. 20, 2017], Dissertation, 235 pages. Retrieved from the Internet: http://ai.stanford.edu/~btaskar/pubs/thesis.pdf.*

Monay et al., PLSA-based Image Auto-Annotation: Constraining the Latent Space, Oct. 10-16, 2004 [retrieved Jul. 20, 2017], Multimedia 2004 Proceedings of the 12th annual ACM International Conference on Multimedia,pp. 348-351. Retrieved from the Internet: http://dl.acm.org/citation.cfm?id=1027608.*

Guo et al., Enhanced Max Margin Learning on Multimodal Data Mining in a Multimedia Database, Aug. 12-15, 2007, ACM: Proceedings of the 13th ACM SIGKDD International Conference on Knowledge Discovery and Data Mining [on-line], San Jose, CA, pp. 340-349.

Guo et al., A Max Margin Framework on Image Annotation and Multimodal Image Retrieval, Jul. 2-5, 2007, 2007 IEEE International Conference on Multimedia and Expo [on-line], pp. 504-507.

Taskar et al., Learning Structured Prediction Models: A Large Margin Approach, 2005, ACM: Proceedings of the 22nd International Conference on Machine Learning [on-line], Bonn, Germany, pp. 896-903.

Evgeniou et al., Statistical Learning Theory: A Primer, 2000, Kluwer Academic Publishers: International Journal of Computer Vision [on-line], vol. 38, No. 1, pp. 9-13.

Yang et al., Region-based Image Annotation using Asymmetrical Support Vector Machine-based Multiple-Instance Learning, 2006, 2006 IEEE Computer Society Conference on Computer Vision and Pattern Recognition, vol. 2, pp. 2057-2063.

Gonzalez-Mendoza et al., DriverVigilance Monitoring, a New Approach, Jun. 17-21, 2002, IEEE Intelligent Vehicle Symposium, 2002, vol. 2, pp. 358-363.

Osuna et al., An Improved Training Algorithm for Support Vector Machines, Sep. 24-26, 1997, Proceedings of the 1997 IEEE Workshop Neural Networks for Signal Processing, pp. 276-285.

Sanchez, Advanced support vector machines and kernel methods [on-line], Sep. 2003 [retrieved on Feb. 13, 2013], Elsevier: Neurocomputing, vol. 55, Issues 1-2, pp. 5-20. http://www.sciencedirect.com/science/article/pii/S0925231203003734.

Collobert et al., SVMTorch: Support Vector Machines for Large-Scale Regression Problems [on-line], Sep. 1, 2001 [retrieved on Feb. 13, 2013], ACM: The Journal of Machine Learning Research, vol. 1, pp. 143-160. http://dl.acm.org/citation.cfm?id=944738.

Brefeld et al., Multi-view Discriminative Sequential Learning [on-line], Oct. 3-7, 2005 [retrieved on Oct. 21, 2013], Machine Learning: 16.sup.th European Conference on Machine Learning 2005: Lecture Notes in Computer Science, vol. 3720, pp. 60-71. http://link.springer.com/chapter/10.1007/11564096.sub.--11#.

Altun et al., "Hidden Markov Support Vector Machines"; Proceedings of the Twentieth International Conference on Machine Learning, 2003; 8 pages.

Blei, et al., "Modeling Annotated Data", ISGIR'03; Jul. 28-Aug. 1, 2003, Toronto, Canada; pp. 1-8.

Boyd et al., "Convex Optimization", Cambridge University Press, 2004, 10 pages total.

Brefeld, et al., "Semi-Supervised Learning for Structured Output Varibles", 23rd International Conference on Machine Learning, 2006, 8 pages.

Chang, Edward, et al. "CBSA: content-based soft annotation for multimodal image retrieval using Bayes point machines." Circuits and Systems for Video Technology, IEEE Transactions on 13.1 (2003): 26-38.

Chu, Wei, Zoubin Ghahramani, and David L. Wild. "A graphical model for protein secondary structure prediction." Proceedings of the twenty-first international conference on Machine learning. ACM, 2004.

Datta, Ritendra, et al. "Toward bridging the annotation-retrieval gap in image search by a generative modeling approach." Proceedings of the 14th annual ACM international conference on Multimedia. ACM, 2006.

Duygulu, Pinar, et al. "Object recognition as machine translation: Learning a lexicon for a fixed image vocabulary." Computer Vision—ECCV 2002. Springer Berlin Heidelberg, 2002. 97-112.

Feng, S. L., Raghavan Manmatha, and Victor Lavrenko. "Multiple bernoulli relevance models for image and video annotation." Computer Vision and Pattern Recognition, 2004. CVPR 2004. Proceedings of the 2004 IEEE Computer Society Conference on. vol. 2. IEEE, 2004.

Freund, Yoav, and Robert E. Schapire. "Large margin classification using the perceptron algorithm." Machine learning 37.3 (1999): 277-296.

Daumé III, Hal, and Daniel Marcu. "Learning as search optimization: Approximate large margin methods for structured prediction." Proceedings of the 22nd international conference on Machine learning. ACM, 2005.

Lafferty, John, Andrew McCallum, and Fernando CN Pereira. "Conditional random fields: Probabilistic models for segmenting and labeling sequence data." (2001).

McCallum, Andrew, Dayne Freitag, and Fernando CN Pereira. "Maximum Entropy Markov Models for Information Extraction and Segmentation." ICML. vol. 17. 2000.

Osuna, Edgar, Robert Freund, and Federico Girosi. "An improved training algorithm for support vector machines." Neural Networks for Signal Processing [1997] VII. Proceedings of the 1997 IEEE Workshop. IEEE, 1997.

Smeulders, Arnold WM, et al. "Content-based image retrieval at the end of the early years." Pattern Analysis and Machine Intelligence, IEEE Transactions on 22.12 (2000): 1349-1380.

Taskar, Ben, et al. "Learning structured prediction models: A large margin approach." Proceedings of the 22nd international conference on Machine learning. ACM, 2005.

Ben Taskar Carlos Guestrin Daphne Koller. "Max-margin Markov networks." Advances in neural information processing systems 16 (2004): 25.

Barnard, Kobus, et al. "Matching words and pictures." The Journal of Machine Learning Research 3 (2003): 1107-1135.

Pan et al., "Automatic Multimedia Cross-modal Correlation Discovery", In Proceedings of the 10th ACM SIGKDD conference, 2004, 6 pages.

Tsochantaridis, Ioannis, et al. "Support vector machine learning for interdependent and structured output spaces." Proceedings of the twenty-first international conference on Machine learning. ACM, 2004.

Vapnik, Vladimir. The nature of statistical learning theory. Springer Science & Business Media, 2013, 10 pages total.

Wu, Yi, Edward Y. Chang, and Belle L. Tseng. "Multimodal metadata fusion using causal strength." Proceedings of the 13th annual ACM international conference on Multimedia. ACM, 2005.

Kiros, Ryan, Ruslan Salakhutdinov, and Richard S. Zemel. "Unifying visual-semantic embeddings with multimodal neural language models." arXiv preprint arXiv:1411.2539 (2014).

(56) References Cited

OTHER PUBLICATIONS

Lazaridou, Angeliki, et al. "From visual attributes to adjectives through decompositional distributional semantics." arXiv preprint arXiv:1501.02714 (2015).

Mao, Junhua, et al. "Learning like a child: Fast novel visual concept learning from sentence descriptions of images." Proceedings of the IEEE International Conference on Computer Vision. 2015.

Wang, Meng, et al. "Multimodal graph-based reranking for web image search." Image Processing, IEEE Transactions on 21.11 (2012): 4649-4661.

Slonim, Noam, et al. "Discriminative feature selection via multiclass variable memory Markov model." EURASIP Journal on Applied Signal Processing 2003 (2003): 93-102.

Tang, Jinhui, et al. "Inferring semantic concepts from community-contributed images and noisy tags." Proceedings of the 17th ACM international conference on Multimedia. ACM, 2009.

Lazaridou, Angeliki, Elia Bruni, and Marco Baroni. "Is this a wampimuk? Cross-modal mapping between distributional semantics and the visual world." ACL (1). 2014.

Bruni, Elia, Nam-Khanh Tran, and Marco Baroni. "Multimodal Distributional Semantics." J. Artif. Intell. Res.(JAIR) 49.1-47 (2014).

Cappallo, Spencer, Thomas Mensink, and Cees GM Snoek. "Image2emoji: Zero-shot emoji prediction for visual media." Proceedings of the 23rd Annual ACM Conference on Multimedia Conference. ACM, 2015.

Chandrika, Pulla, and C. V. Jawahar. "Multi modal semantic indexing for image retrieval." Proceedings of the ACM International Conference on Image and Video Retrieval. ACM, 2010.

Lienhart, Rainer, Stefan Romberg, and Eva Hörster. "Multilayer pLSA for multimodal image retrieval." Proceedings of the ACM International Conference on Image and Video Retrieval. ACM, 2009.

Chang, Xiaojun, et al. "Semantic concept discovery for large-scale zero-shot event detection." International Joint Conference on Artificial Intelligence (IJCAI). 2015.

Caicedo, Juan C., et al. "Multimodal representation, indexing, automated annotation and retrieval of image collections via non-negative matrix factorization." Neurocomputing 76.1 (2012): 50-60.

Chang, Shih-Fu, et al. "Large-scale multimodal semantic concept detection for consumer video." Proceedings of the international workshop on Workshop on multimedia information retrieval. ACM, 2007.

Camargo, Jorge E., and Fabio A. González. "Multimodal latent topic analysis for image collection summarization." Information Sciences 328 (2016): 270-287.

André, Barbara, et al. "Learning semantic and visual similarity for endomicroscopy video retrieval." Medical Imaging, IEEE Transactions on 31.6 (2012): 1276-1288.

Silberer, Carina, Vittorio Ferrari, and Mirella Lapata. "Models of Semantic Representation with Visual Attributes." ACL (1). 2013.

Zhang, Ruofei, et al. "A probabilistic semantic model for image annotation and multimodal image retrieval." Computer Vision, 2005. ICCV 2005. Tenth IEEE International Conference on. vol. 1. IEEE, 2005.

Rui, Yong, et al. "Relevance feedback: a power tool for interactive content-based image retrieval." Circuits and Systems for Video Technology, IEEE Transactions on 8.5 (1998): 644-655.

\* cited by examiner

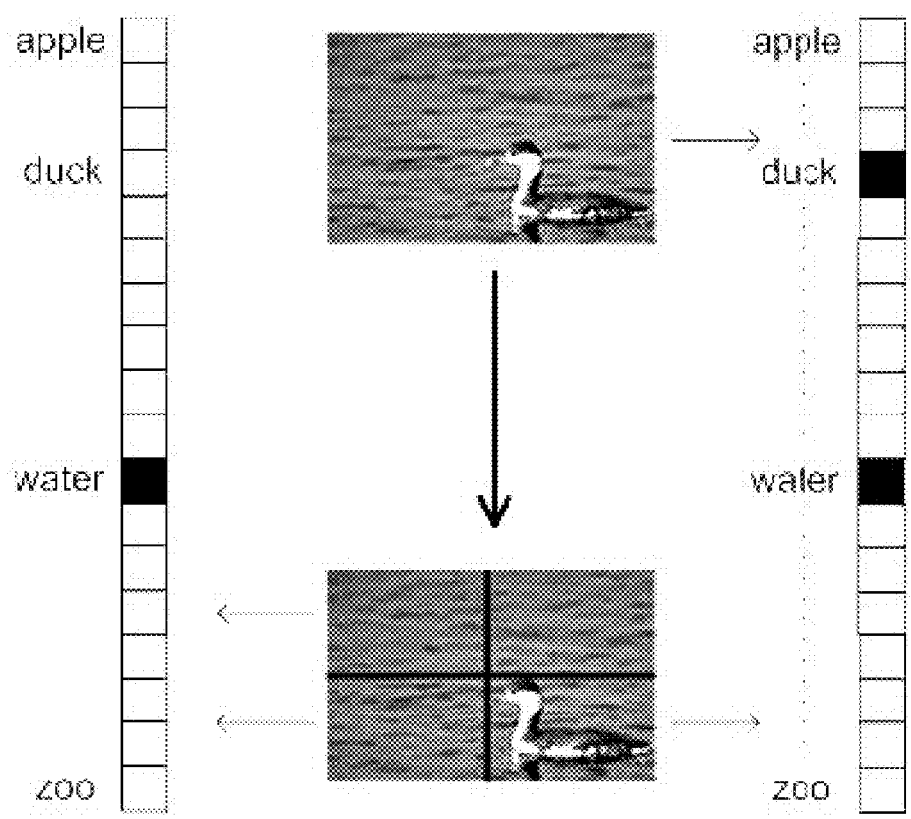
Fig. 1
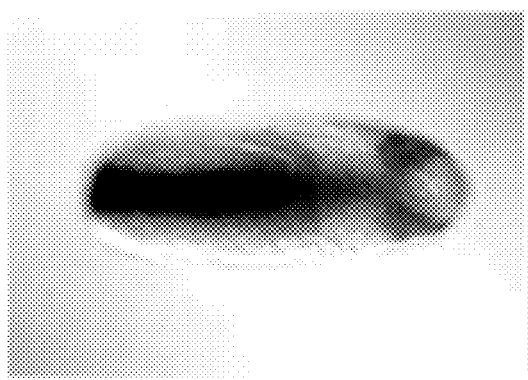 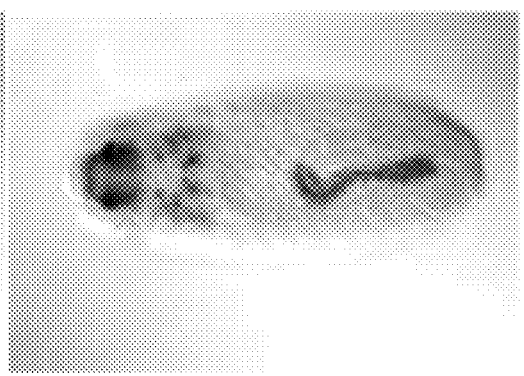
Fig. 2A                Fig. 2B

ENHANCED MAX MARGIN LEARNING ON MULTIMODAL DATA MINING IN A MULTIMEDIA DATABASE

CROSS REFERENCE TO RELATED APPLICATIONS

The application is a Continuation of U.S. patent application Ser. No. 13/903,018, filed May 28, 2013, now U.S. Pat. No. 8,923,630, issued Dec. 30, 2014, which is a Division of U.S. patent application Ser. No. 12/538,845, filed Aug. 10, 2009, now U.S. Pat. No. 8,463,035, issued Jun. 11, 2013, which is a Non-Provisional of U.S. Provisional Patent Application No. 61/087,169, filed Aug. 8, 2008, each of which is expressly incorporated herein by reference.

GOVERNMENT SUPPORT STATEMENT

This invention was made with Government Support under IIS-0535162 awarded by the National Science Foundation. The Government has certain rights in this invention.

1. INTRODUCTION

Multimodal data mining in a multimedia database is a challenging topic in data mining research. Multimedia data may consist of data in different modalities, such as digital images, audio, video, and text data. In this context, a multimedia database refers to a data collection in which there are multiple modalities of data such as text and imagery. In this database system, the data in different modalities are related to each other. For example, the text data are related to images as their annotation data. By multimodal data mining in a multimedia database it is meant that the knowledge discovery to the multimedia database is initiated by a query that may also consist of multiple modalities of data such as text and imagery. A multimedia database is provided having an image database in which each image has a few textual words given as annotation. The problem of multimodal data mining in such an image database is addressed as the problem of retrieving similar data and/or inferencing new patterns to a multimodal query from the database.

Specifically, multimodal data mining refers to two aspects of activities. The first is the multimodal retrieval. This is the scenario where a multimodal query consisting of either textual words alone, or imagery alone, or in any combination is entered and an expected retrieved data modality is specified that can also be text alone, or imagery alone, or in any combination; the retrieved data based on a pre-defined similarity criterion are returned back to the user. The second is the multimodal inferencing. While the retrieval based multimodal data mining has its standard definition in terms of the semantic similarity between the query and the retrieved data from the database, the inferencing based mining depends on the specific applications. One application of the present technology is directed toward fruit fly image database mining. Consequently, the inferencing based multimodal data mining may include many different scenarios. A typical scenario is the across-stage multimodal inferencing. There are many interesting questions a biologist may want to ask in the fruit fly research given such a multimodal mining capability. For example, given an embryo image in stage 5, what is the corresponding image in stage 7 for an image-to-image three-stage inferencing? What is the corresponding annotation for this image in stage 7 for an image-to-word three-stage inferencing? The multimodal mining technique according to an embodiment of the present invention also addresses this type of across-stage inferencing capability, in addition to the multimodal retrieval capability.

In the image retrieval research area, one of the notorious bottlenecks is the semantic gap [18]. Recently, it is reported that this bottleneck may be reduced by the multimodal data mining approaches [3, 11] which take advantage of the fact that in many applications image data typically co-exist with other modalities of information such as text. The synergy between different modalities may be exploited to capture the high level conceptual relationships.

To exploit the synergy among the multimodal data, the relationships among these different modalities need to be learned. For an image database, the relationship between images and text should be learned. The learned relationship between images and text can then be further used in multimodal data mining. Without loss of generality, a special case of the multimodal data mining problem—image annotation, where the input is an image query and the expected output is the annotation words, is analyzed. This approach is also valid to the general multimodal data mining problem. The image annotation problem can be formulated as a structured prediction problem where the input (image) x and the output (annotation) y are structures. An image can be partitioned into blocks which form a structure. The word space can be denoted by a vector where each entry represents a word. Under this setting, the learning task is therefore formulated as finding a function $f: X \times Y \to \mathcal{L}$ such that $$\hat{y} = \underset{y \in Y}{\mathrm{argmax}}\, f(x, y) \qquad (1)$$

is the desired output for any input x.

Built upon the existing literature on the max margin learning, a new max margin learning approach is provided on the structured output space to learn the above function. Like the existing max margin learning methods, the image annotation problem may be formulated as a quadratic programming (QP) problem. The relationship between images and text is discovered once this QP problem is solved. Unlike the existing max margin learning methods, the new max margin learning method is much more efficient with a much faster convergence rate. Consequently, this new max margin learning approach is called Enhanced Max Margin Learning (EMML). EMML is further applied for solving the multimodal data mining problem effectively and efficiently.

Note that the proposed approach is general that can be applied to any structured prediction problems. For the evaluation purpose, this approach is applied to the Berkeley Drosophila embryo image database. Extensive empirical evaluations against a state-of-the-art method on this database are reported.

2. RELATED WORK

Multimodal approaches have recently received the substantial attention since Barnard and Duygulu et al. started their pioneering work on image annotation [3, 10]. Recently there have been many studies [4, 17, 11, 7, 9, 23] on the multimodal approaches.

The learning with structured output variables covers many natural learning tasks including named entity recognition, natural language parsing, and label sequence learning. There have been many studies on the structured model which include conditional random fields [14], maximum entropy model [15], graph model [8], semi-supervised learning [6] and max margin approaches [13, 21, 20, 2]. The challenge of learning with structured output variables is that the number of the structures is exponential in terms of the size of the structure output space. Thus, the problem is intractable if we treat each structure as a separate class. Consequently, the multiclass approach is not well fitted into the learning with structured output variables.

As an effective approach to this problem, the max margin principle has received substantial attention since it was used in the support vector machine (SVM) [22]. In addition, the perceptron algorithm is also used to explore the max margin classification [12]. Taskar et al. [19] reduce the number of the constraints by considering the dual of the loss-augmented problem. However, the number of the constraints in their approach is still large for a large structured output space and a large training set.

For learning with structured output variables, Tsochantaridis et al. [21] propose a cutting plane algorithm which finds a small set of active constraints. One issue of this algorithm is that it needs to compute the most violated constraint which would involve another optimization problem in the output space. In EMML, instead of selecting the most violated constraint, a constraint may be arbitrarily selected which violates the optimality condition of the optimization problem. Thus, the selection of the constraints does not involve any optimization problem. Osuna et al. [16] propose the decomposition algorithm for the support vector machine. In EMML, their idea is extended to the scenario of learning with structured output variables.

3. HIGHLIGHTS

An aspect of the present invention, is based on the existing literature on max margin learning, and aims at solving for the problem of multimodal data mining in a multimedia database. Significant enhancements include: (1) a new max margin learning approach—the enhanced max margin learning framework that is much more efficient in learning with a much faster convergence rate, which is verified in empirical evaluations; (2) application of this EMML approach to developing an effective and efficient solution to the multimodal data mining problem that is highly scalable in the sense that the query response time is independent of the database scale, allowing facilitating a multimodal data mining querying to a very large scale multimedia database, and excelling many existing multimodal data mining methods in the literature that do not scale up at all; this advantage is also supported through the complexity analysis as well as empirical evaluations against a state-of-the-art multimodal data mining method from the literature.

4. LEARNING IN THE STRUCTURED OUTPUT SPACE

Assume that the image database consists of a set of instances $S=\{(I_i, W_i)\}_{i=1}^{L}$ where each instance consists of an image object Ii and the corresponding annotation word set $W_i$. First an image is partitioned into a set of blocks. Thus, an image can be represented by a set of sub-images. The feature vector in the feature space for each block can be computed from the selected feature representation. Consequently, an image is represented as a set of feature vectors in the feature space. A clustering algorithm is then applied to the whole feature space to group similar feature vectors together. The centroid of a cluster represents a visual representative (referred to herein as VRep) in the image space. In FIG. 1, there are two VReps, water and duck in the water. The corresponding annotation word set can be easily obtained for each VRep. Consequently, the image database becomes the VRep-word pairs $S=\{(x_i, y_i)\}_{i=1}^{n}$, where n is the number of the clusters, $x_i$ is a VRep object and $y_i$ is the word annotation set corresponding to this VRep object. Another simple method to obtain the VRep-word pairs is that some images are randomly selected from the image database and each image is viewed as a VRep.

Suppose that there are W distinct annotation words. An arbitrary subset of annotation words is represented by the binary vector $\bar{y}$ whose length is W; the j-th component $\bar{y}_j=1$ if the j-th word occurs in this subset, and 0 otherwise. All possible binary vectors form the word space Y. $w_j$ is used to denote the j-th word in the whole word set. x is used to denote an arbitrary vector in the feature space. FIG. 1 shows an illustrative example in which the original image is annotated by duck and water which are represented by a binary vector. There are two VReps after the clustering and each has a different annotation. In the word space, a word may be related to other words. For example, duck and water are related to each other because water is more likely to occur when duck is one of the annotation words. Consequently, the annotation word space is a structured output space where the elements are interdependent.

The relationship between the input example VRep x and an arbitrary output $\bar{y}$ is represented as the joint feature mapping $\Phi(x, \bar{y})$, $\Phi: X \times Y \rightarrow \angle^d$ where d is the dimension of the joint feature space. It can be expressed as a linear combination of the joint feature mapping between x and all the unit vectors. That is $$\Phi(x, \bar{y}) = \sum_{j=1}^{W} \bar{y}_j \Phi(x, e_j)$$

where $e_j$ is the j-th unit vector. The score between x and $\bar{y}$ can be expressed as a linear combination of each component in the joint feature representation: $f(x, \bar{y})=\langle\alpha, \Phi(x, \bar{y})\rangle$. Then the learning task is to find the optimal weight vector $\alpha$ such that the prediction error is minimized for all the training instances. That is $$\operatorname*{argmax}_{\bar{y} \in Y_i} f(x_i, y) \approx y_i, i = 1, \ldots, n$$

where $Y_i = \{\bar{y} | \Sigma_{j=1}^{W} \bar{y}_j = \Sigma_{j=1}^{W} y_{ij}\}$. $\Phi_i(\bar{y})$ is used to denote $\Phi(x_i, \bar{y})$. To make the prediction to be the true output $y_i$, we should follow $$\alpha^T \Phi_i(y_i) \geq \alpha^T \Phi_i(\bar{y}), \forall \bar{y} \in Y_i \backslash \{y_i\}$$

where $Y_i \backslash \{y_i\}$ denotes the removal of the element $y_i$ from the set $Y_i$. In order to accommodate the prediction error on the training examples, the slack variable $\xi_i$ is introduced.

The above constraint then becomes $$\alpha^T \Phi_i(y_i) \geq \alpha^T \Phi_i(\bar{y}) - \xi_i, \xi_i \geq 0 \; \forall \bar{y} \in Y_i \backslash \{y_i\}$$

The prediction error is measured on the training instances by the loss function which is the distance between the true output $y_i$, and the prediction $\bar{y}$. The loss function measures the goodness of the learning model. The standard zero-one classification loss is not suitable for the structured output space. The loss function $l(\bar{y}, y_i)$ is defined as the number of the different entries in these two vectors. The loss function is included in the constraints as is proposed by Taskar et al. [19]

$$\alpha^T \Phi_i(y_i) \geq \alpha^T \Phi_i(\bar{y}) + 1(y, y_i) - \xi_i$$

$$\frac{1}{\|\alpha\|} \alpha^T [\Phi_i(y_i) - \Phi_i(\bar{y})]$$

is interpreted as the margin of $y_i$ over another $\bar{y} \in Y^{(i)}$. The above constraint is rewritten as $$\frac{1}{\|\alpha\|} \alpha^T [\Phi_i(y_i) - \Phi_i(\bar{y})] \geq \frac{1}{\|\alpha\|} [l(\bar{y}, y_i) - \xi_i].$$

Thus, minimizing $\|\alpha\|$ maximizes such margin.

The goal now is to solve the optimization problem $$\min \frac{1}{2} \|\alpha\|^2 + C \sum_{i=1}^{n} \xi_i^r \quad (2)$$

$$\text{s.t.} \quad \alpha^T \Phi_i(y_i) - \Phi_i(\bar{y}) + l(\bar{y}, y_i) - \xi_i$$

$$\forall \bar{y} \in Y_i \setminus \{y_i\} \quad \xi_i \geq 0, \quad i = 1, \ldots, n$$

where r=1, 2 corresponds to the linear or quadratic slack variable penalty. The linear slack variable penalty is used. For r=2, similar results are obtained. C>0 is a constant that controls the tradeoff between the training error minimization and the margin maximization.

Note that in the above formulation, the relationships between different words in the word space are not introduced. However, the relationships between different words are implicitly included in the VRep-word pairs because the related words are more likely to occur together. Thus, Eq. (2) is in fact a structured optimization problem.

4.1 EMML Framework

One can solve the optimization problem Eq. (2) in the primal space—the space of the parameters $\alpha$. In fact this problem is intractable when the structured output space is large because the number of the constraints is exponential in terms of the size of the output space. As in the traditional support vector machine, the solution can be obtained by solving this quadratic optimization problem in the dual space—the space of the Lagrange multipliers. Vapnik [22] and Boyd et al. [5] have an excellent review for the related optimization problem.

The dual problem formulation has an important advantage over the primal problem: it only depends on the inner products in the joint feature representation defined by $\Phi$, allowing the use of a kernel function. The Lagrange multiplier $\mu_{i,\bar{y}}$ is introduced for each constraint to form the Lagrangian. $\Phi_{i,yi,\bar{y}} = \Phi_i(y_i) - \Phi_i(\bar{y})$ and the kernel function $K((x_i, \bar{y}), (x_j, \tilde{y})) = \langle \Phi_{i,yi,\bar{y}}, \Phi_{j,yj,\tilde{y}} \rangle$ are defined. The derivatives of the Lagrangian over $\alpha$ and $\xi_i$ should be equal to zero. Substituting these conditions into the Lagrangian, the following Lagrange dual problem is obtained:

$$\min \frac{1}{2} \sum_{\substack{i,j \\ \bar{y} \neq y_i \\ \tilde{y} \neq y_j}} \mu_{i,\bar{y}} \mu_{j,\tilde{y}} K((x_i, \tilde{y})) - \sum_{\substack{i \\ \bar{y} \neq y_i}} \mu_{i,\bar{y}}(y, y_i) \quad (3)$$

-continued $$\text{s.t.} \sum_{\bar{y} \neq y_i} \mu_{i,\bar{y}} \leq C \quad \mu_{i,\bar{y}} \geq 0, \quad i = 1, \ldots, n$$

After this dual problem is solved, we have $\alpha = \sum_{i,\bar{y}} \mu_{i,\bar{y}} \Phi_{i,yi,\bar{y}}$.

For each training example, there are a number of constraints related to it. The subscript i is used to represent the part related to the i-th example in the matrix. For example, let $\mu_i$ be the vector with entries $\mu_{i,\bar{y}}$. The $\mu_i$ is stacked together to form the vector $\mu$. That is $\mu = [\mu_1^T \ldots \mu_n^T]^T$. Similarly, let $S_i$ be the vector with entries $l(\bar{y}, y_i)$. $S_j$ are stacked together to form the vector S. That is $S = [S_1^T \ldots S_n^T]^T$. The lengths of $\mu$ and S are the same. $A_i$ is defined as the vector which has the same length as that of $\mu$, where $A_i$, $\bar{y}=1$ and $A_j$, $\bar{y}=0$ for $j \neq i$. Let $A = [A_1 \ldots A_n]^T$. Let matrix D represent the kernel matrix where each entry is $K((x_i, \bar{y}), (x_j, \tilde{y}))$. Let C be the vector where each entry is constant C.

With the above notations the Lagrange dual problem may be rewritten as follows $$\min \frac{1}{2} \mu^T D \mu - \mu^T S \quad (4)$$

$$\text{s.t.} \quad \begin{array}{l} A\mu \leq C \\ \mu \geq 0 \end{array}$$

where $\leq$ and $\geq$ represent the vector comparison defined as entry-wise less than or equal to and greater than or equal to, respectively.

Eq. (4) has the same number of the constraints as Eq. (2). However, in Eq. (4) most of the constraints are lower bound constraints ($\mu \geq 0$) which define the feasible region. Other than these lower bound constraints, the rest constraints determine the complexity of the optimization problem. Therefore, the number of constraints is considered to be reduced in Eq. (4). However, the challenge still exists to solve it efficiently since the number of the dual variables is still huge. Osuna et al. [16] propose a decomposition algorithm for the support vector machine learning over large data sets. This idea may be extended to learning with the structured output space. The constraints of the optimization problem Eq. (2) may be decomposed into two sets: the working set B and the nonactive set N. The Lagrange multipliers are also correspondingly partitioned into two parts $\mu_B$ and $\mu_N$. We are interested in the subproblem defined principally for the dual variable set $\mu_B$ when keeping $\mu_N = 0$.

This subproblem is formulated as follows.

$$\min \frac{1}{2} \mu^T D \mu - \mu^T S \quad (5)$$

$$\text{s.t.} \quad \begin{array}{l} A\mu \leq C \\ \mu_B \geq 0, \quad \mu_N = 0 \end{array}$$

It is clearly true that those $\mu_{i,\bar{y}} = 0$, $\mu_{i,\bar{y}} \in \mu_B$ can be moved to set $\mu_N$ without changing the objective function. Furthermore, those $\mu_{i,\bar{y}} \in \mu_N$ satisfying certain conditions can be moved to set $\mu_B$ to form a new optimization subproblem which yields a strict decrease in the objective function in Eq. (4) when the new subproblem is optimized. This property is guaranteed by the following theorem.

Theorem 1. Given an optimal solution of the subproblem defined on $\mu_B$ in Eq. (5), if the following conditions hold true:

$\exists i, \Sigma_{\bar{y}} \mu_{i,\bar{y}} < C$ $\exists \mu_{i,\bar{y}} \in \mu_N, \alpha^T \Phi_{i,y_i,\bar{y}} - l(\bar{y}, y_i) < 0$ (6)

the operation of moving the Lagrange multiplier $\mu_{i,\bar{y}}$ satisfying Eq. (6) from set $\mu_N$ to set $\mu_B$ generates a new optimization subproblem that yields a strict decrease in the objective function in Eq. (4) when the new subproblem in Eq.(5) is optimized.

Proof. Suppose that the current optimal solution is $\mu$. Let $\delta$ be a small positive number. Let $\bar{\mu} = \mu + \delta e_r$, where $e_r$ is the r-th unit vector and $r = (i, \bar{y})$ denotes the Lagrange multiplier satisfying condition Eq. (6). Thus, the objective function becomes $$W(\bar{\mu}) = \frac{1}{2}(\mu + \delta e_r)^T D (\mu + \delta e_r) - (\mu + \delta e_r)^T S$$

$$= \frac{1}{2}(\mu^T D \mu + \delta e_r^T D \mu + \delta \mu^T D e_r + \delta^2 e_r^T D e_r) - \mu^T S - \delta e_r^T S$$

$$= W(\mu) + \frac{1}{2}(\delta e_r^T D \mu + \delta \mu^T D e_r + \delta^2 e_r^T D e_r) - \delta e_r^T S$$

$$= W(\mu) + \delta e_r^T D \mu - \delta e_r^T S + \frac{1}{2} \delta^2 e_r^T D e_r$$

$$= W(\mu) + \delta(\alpha^T \Phi_{i,y_i,\bar{y}} - l(\bar{y}, y_i)) + \frac{1}{2} \delta^2 \|\Phi_{i,y_i,\bar{y}}\|^2$$

Since $\alpha^T \Phi_{i,y_i,\bar{y}} - l(\bar{y}, y_i) < 0$, for small enough $\delta$, $W(\bar{\mu}) < W(\mu)$. For small enough $\delta$, the constraints $A\bar{\mu} \leq C$ is also valid. Therefore, when the new optimization subproblem in Eq. (5) is optimized, there must be an optimal solution no worse than $\bar{\mu}$.

In fact, the optimal solution is obtained when there is no Lagrange multiplier satisfying the condition Eq. (6). This is guaranteed by the following theorem.

Theorem 2. The optimal solution of the optimization problem in Eq. (4) is achieved if and only if the condition Eq. (6) does not hold true.

Proof. If the optimal solution $\hat{\mu}$ is achieved, the condition Eq. (6) must not hold true. Otherwise, $\hat{\mu}$ is not optimal according to the Theorem 1. To prove in the reverse direction, the Karush-Kuhn-Tucker (KKT) conditions [5] of the optimization problem Eq. (4) are considered.

$D\mu - S + A^T \gamma - \pi = 0$ $\gamma^T (C - A\mu) = 0$ $\pi^T \mu = 0$ $\gamma \geq 0$ $\pi \geq 0$ For the optimization problem Eq. (4), the KKT conditions provide necessary and sufficient conditions for optimality. One can check that the condition Eq. (6) violates the KKT conditions. On the other hand, one can check that the KKT conditions are satisfied when the condition Eq. (6) does not hold true. Therefore, the optimal solution is achieved when the condition Eq. (6) does not hold true.

The above theorems suggest the Enhanced Max Margin Learning (EMML) algorithm listed in Algorithm 1. The correctness (convergence) of EMML algorithm is provided by Theorem 3.

Algorithm 1: EMML Algorithm
Input: n labeled examples, dual variable set $\mu$.
Output: Optimized $\mu$.
1: procedure
2: Arbitrarily decompose $\mu$ into two sets, $\mu_B$ and $\mu_N$.
3: Solve the subproblem in Eq. (5) defined by the variables in $\mu_B$.
4: While there exists $\mu_{i,\bar{y}} \in \mu_B$ such that $\mu_{i,\bar{y}} = 0$, move it to set $\mu_N$.
5: While there exists $\mu_{i,\bar{y}} \in \mu_N$ satisfying condition Eq. (6), move it to set $\mu_B$. If no such $\mu_{i,\bar{y}} \in \mu_N$ exists, the iteration exits.
6: Goto step 4.
7: end procedure.

Theorem 3. EMML algorithm converges to the global optimal solution in a finite number of iterations.

Proof. This is the direct result from Theorems 1 and 2. Step 3 in Algorithm 1 strictly decreases the objective function of Eq. (4) at each iteration and thus the algorithm does not cycle. Since the objective function of Eq. (4) is convex and quadratic, and the feasible solution region is bounded, the objective function is bounded. Therefore, the algorithm must converge to the global optimal solution in a finite number of iterations.

Note that in Step 5, only one dual variable satisfying Eq. (6) need be found. All the dual variables in the set $\mu_N$ are examined only when no dual variable satisfies Eq. (6). It is fast to examine the dual variables in the set $\mu_N$ even if the number of the dual variables is large.

4.2 Comparison with Other Methods

In the max margin optimization problem Eq. (2), only some of the constraints determine the optimal solution. These constraints are called active constraints. Other constraints are automatically met as long as these active constraints are valid. EMML algorithm uses this fact to solve the optimization problem by substantially reducing the number of the dual variables in Eq. (3).

In the recent literature, there are also other methods attempting to reduce the number of the constraints. Taskar et al. [19] reduce the number of the constraints by considering the dual of the loss-augmented problem. However, the number of the constraints in their approach is still large for a large structured output space and a large training set. They do not use the fact that only some of the constraints are active in the optimization problem. Tsochantaridis et al. [21] also propose a cutting plane algorithm which finds a small set of active constraints. One issue of this algorithm is that it needs to compute the most violated constraint which would involve another optimization problem in the output space. In EMML, instead of selecting the most violated constraint, a constraint is arbitrarily selected which violates the optimality condition of the optimization problem. Thus, the selection of the constraint does not involve any optimization problem. Therefore, EMML is much more efficient in learning with a much faster convergence rate.

5. MULTIMODAL DATA MINING

The solution to the Lagrange dual problem makes it possible to capture the semantic relationships among different data modalities. The developed EMML framework is shown to be useful to solve for the general multimodal data mining problem in all the scenarios. Specifically, given a training data set, the direct relationship between the VRep space and the word space using the EMML framework in Algorithm 1 is immediately obtained. Given this obtained direct relationship, various the multimodal data mining scenarios can be facilitated.

5.1 Image Annotation

Image annotation refers to generating annotation words for a given image. First the test image is partitioned into blocks and compute the feature vector in the feature space for each block. The similarity between feature vectors and the VReps in terms of the distance are computed. The top n most-relevant VReps are returned. For each VRep, the score between this VRep and each word is computed as the function $f$ in Eq. (1). Thus, for each of the top n most relevant VReps, the ranking-list of words in terms of the score are provided. These n ranking-lists are merged and sorted to obtain the overall ranking-list of the whole word space. Finally, the top m words are returned as the annotation result.

In this approach, the score between the VReps and the words can be computed in advance. Thus, the computation complexity of image annotation is only related to the number of the VReps. Under the assumption that all the images in the image database follow the same distribution, the number of the VReps is independent of the database scale. Therefore, the computation complexity in this approach is O(1) which is independent of the database scale.

5.2 Word Query

Word query refers to generating corresponding images in response to a query word. For a given word input, the score between each VRep and the word is computed as the function $f$ in Eq. (1). Thus, the top n most relevant VReps are returned. Since for each VRep, we compute the similarity between this VRep and each image in the image database in terms of the distance, for each of those top n most relevant VReps, the ranking-list of images in terms of the distance is provided. These n ranking-lists are then merged and sorted to obtain the overall ranking-list in the image space. Finally, the top m images are returned as the query result.

For each VRep, the similarity between this VRep and each image in the image database can be computed in advance. Similar to the analysis in Sec. 5.1, the computation complexity is only related to the number of the VReps, which is O(1).

5.3 Image Retrieval

Image retrieval refers to generating semantically similar images to a query image. Given a query image, we annotate it using the procedure in Sec. 5.1. In the image database, for each annotation word j there are a subset of images $S_j$ in which this annotation word appears. We then have the union set $S = \cup_j S_j$ for all the annotation words of the query image.

On the other hand, for each annotation word j of the query image, the word query procedure in Sec. 5.2 is used to obtain the related sorted image subset $T_j$ from the image database. These subsets $T_j$ are merged to form the sorted image set T in terms of their scores. The final image retrieval result is $R = S \cap T$.

In this approach, the synergy between the image space and the word space is exploited to reduce the semantic gap based on the developed learning approach. Since the complexity of the retrieval methods in Secs. 5.1 and 5.2 are both O(1), and since these retrievals are only returned for the top few items, respectively, finding the intersection or the union is O(1). Consequently, the overall complexity is also O(1).

5.4 Multimodal Image Retrieval

The general scenario of multimodal image retrieval is a query as a combination of a series of images and a series of words. Clearly, this retrieval is simply a linear combination of the retrievals in Secs. 5.2 and 5.3 by merging the retrievals together based on their corresponding scores. Since each individual retrieval is O(1), the overall retrieval is also O(1).

5.5 Across-Stage Inferencing

For a fruit fly embryo image database such as the Berkeley Drosophila embryo image database which is used for experimental evaluations, we have embryo images classified in advance into different stages of the embryo development with separate sets of textual words as annotation to those images in each of these stages. In general, images in different stages may or may not have the direct semantic correspondence (e.g., they all correspond to the same gene), not even speaking that images in different stages may necessarily exhibit any visual similarity. FIG. 2 shows an example of a pair of embryo images at stages 9-10 (FIG. 2(a)) and stages 13-16 (FIG. 2(b)), respectively. They both correspond to the same gene in the two different stages. (The Berkeley Drosophila embryo image database is given in such a way that images from several real stages are mixed together to be considered as one "stage". Thus, stages 9-10 are considered as one stage, and so are stages 13-16.) However, it is clear that they exhibit a very large visual dissimilarity.

Consequently, it is not appropriate to use any pure visual feature based similarity retrieval method to identify such image-to-image correspondence across stages. Furthermore, we also expect to have the word-to-image and image-to-word inferencing capabilities across different stages, in addition to the image-to-image inferencing.

Given this consideration, this is exactly where the proposed approach for multimodal data mining can be applied to complement the existing pure retrieval based methods to identify such correspondence. Typically in such a fruit fly embryo image database, there are textual words for annotation to the images in each stage. These annotation words in one stage may or may not have the direct semantic correspondence to the images in another stage. However, since the data in all the stages are from the same fruit fly embryo image database, the textual annotation words between two different stages share a semantic relationship that can be obtained by a domain ontology.

In order to apply this approach to this across-stage inferencing problem, each stage is treated as a separate multimedia database, and map the across-stage inferencing problem to a retrieval based multimodal data mining problem by applying the approach to the two stages such that the multimodal query is taken as the data from one stage and pose the query to the data in the other stage for the retrieval based multimodal data mining. FIG. 3 illustrates the diagram of the two stages (state i and state j where i≠j) image-to-image inferencing.

Clearly, in comparison with the retrieval based multimodal data mining analyzed in the previous sections, the only additional complexity here in across-stage inferencing is the inferencing part using the domain ontology in the word space. Typically this ontology is small in scale. In fact, in evaluations for the Berkeley Drosophila embryo image database, this ontology is handcrafted and is implemented as a look-up table for word matching through an efficient hashing function. Thus, this part of the computation may be ignored. Consequently, the complexity of the across-stage inferencing based multimodal data mining is the same as that of the retrieval based multimodal data mining which is independent of database scale.

BRIEF DESCRIPTION OF THE DRAWINGS

FIG. 1 shows an illustration of the image partitioning and the structured output word space, respectively.

FIGS. 2A and 2B show a pair of embryo images corresponding to the same gene in the two different stages.

6. EMPIRICAL EVALUATIONS

While EMML is a general learning framework, and it can also be applied to solve for a general multimodal data mining problem in any application domains, for the evaluation purpose, it is applied to the Berkeley Drosophila embryo image database [1] for the multimodal data mining task addressed herein. The performance of this approach is evaluated using this database for both the retrieval based and the across-stage inferencing based multimodal data mining scenarios. This approach is compared with a state-of-the-art multimodal data mining method MBRM [11] for the mining performance.

In this image database, there are in total 16 stages of the embryo images archived in six different folders with each folder containing two to four real stages of the images; there are in total 36,628 images and 227 words in all the six folders; not all the images have annotation words. For the retrieval based multimodal data mining evaluations, the fifth folder is used as the multimedia database, which corresponds to stages 11 and 12. There are about 5,500 images that have annotation words and there are 64 annotation words in this folder. The whole folder's images are split into two parts (one third and two thirds), with the two thirds used in the training and the one third used in the evaluation testing. For the across-stage inferencing based multimodal data mining evaluations, the fourth and the fifth folders are used for the two stages inferencing evaluations, and use the third, the fourth and the fifth folders for the three stages inferencing evaluations. Consequently, each folder here is considered as a "stage" in the across-stage inferencing based multimodal data mining evaluations. In each of the inferencing scenarios, the same split is used as in the retrieval based multimodal data mining evaluations for training and testing.

In order to facilitate the across-stage inferencing capabilities, the ontology of the words involved in the evaluations may be handcrafted. This is simply implemented as a simple look-up table indexed by an efficient hashing function. For example, cardiac mesoderm primordium in the fourth folder is considered as the same as circulatory system in the fifth folder. With this simple ontology and word matching, the proposed approach may be well applied to this across-stage inferencing problem for the multimodal data mining.

Figure 3:
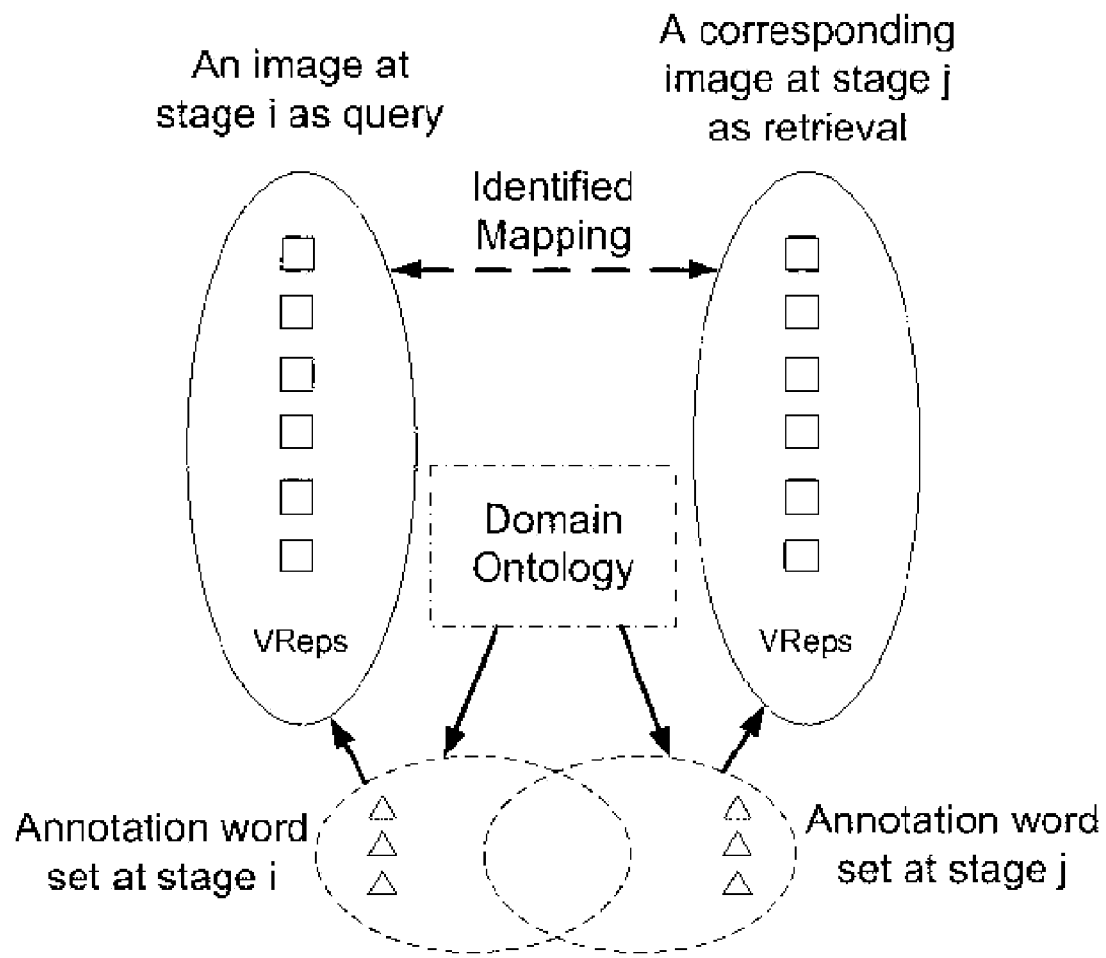
FIG. 3 shows an illustrative diagram for image-to-image across two stages inferencing.
Figure 4:
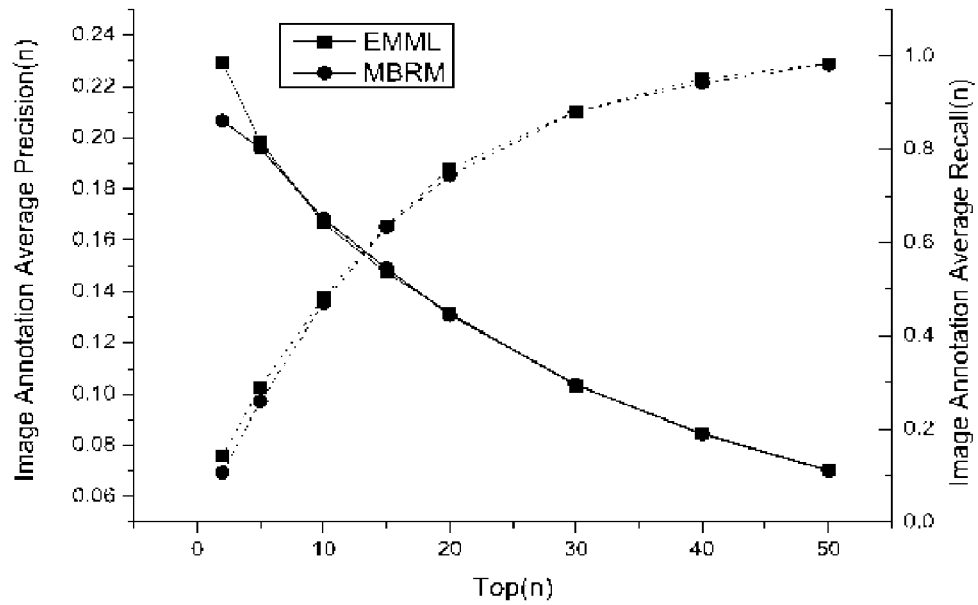
FIG. 4 shows precisions and recalls of image annotation between EMML and MBRM (the solid lines are for precisions and the dashed lines are for recalls).
Figure 5:
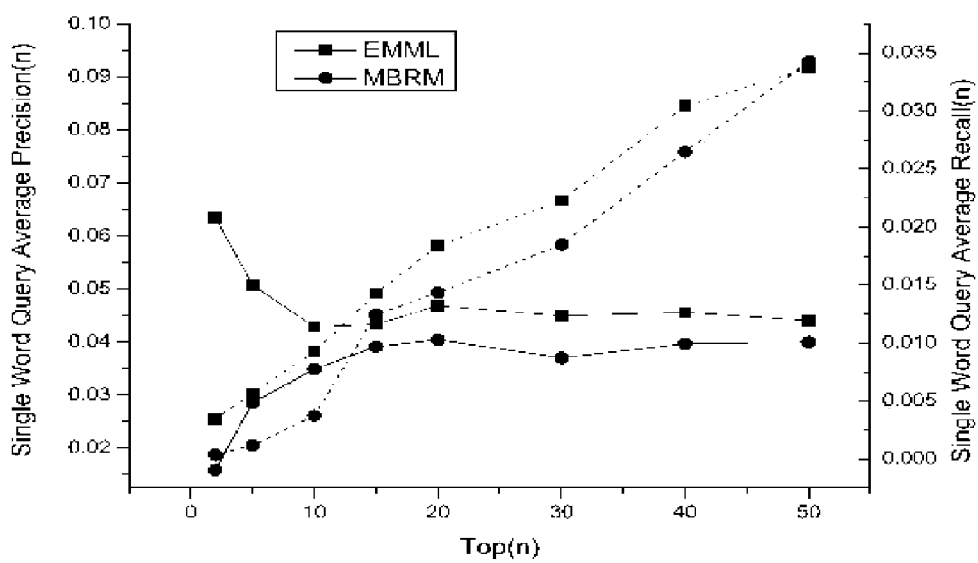
FIG. 5 shows precisions and recalls of word query between EMML and MBRM.
Figure 6:
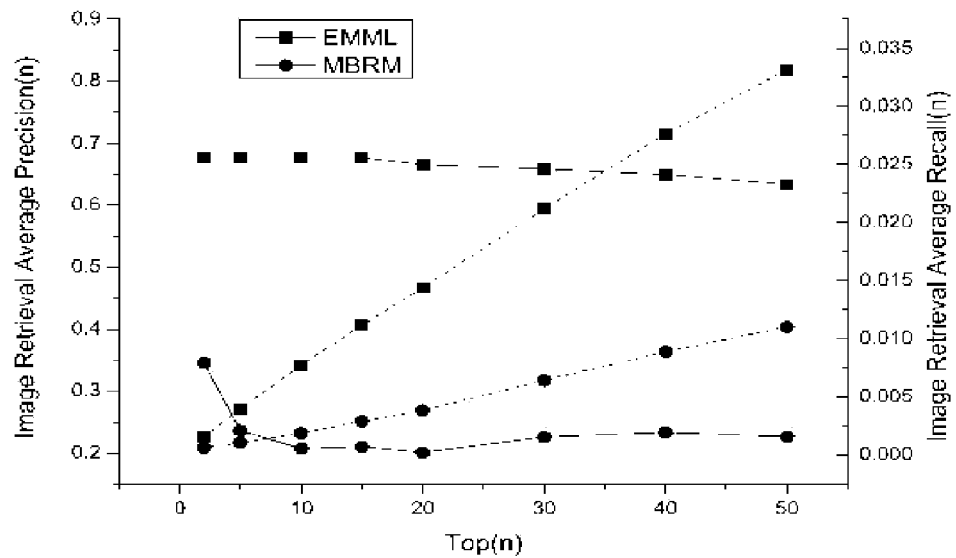
FIG. 6 shows precisions and recalls of image retrieval between EMML and MBRM.

The EMML algorithm is applied to obtain the model parameters. In the figures below, the horizontal axis denotes the number of the top retrieval results. The performance from the top 2 to the top 50 retrieval results is investigated. FIG. 4 reports the precisions and recalls averaged over 1648 queries for image annotation in comparison with MBRM model where the solid lines are for precisions and the dashed lines are for recalls. Similarly, FIG. 5 reports the precisions and recalls averaged over 64 queries for word query in comparison with MBRM model. FIG. 6 reports the precisions and recalls averaged over 1648 queries for image retrieval in comparison with MBRM model.

Figure 7:
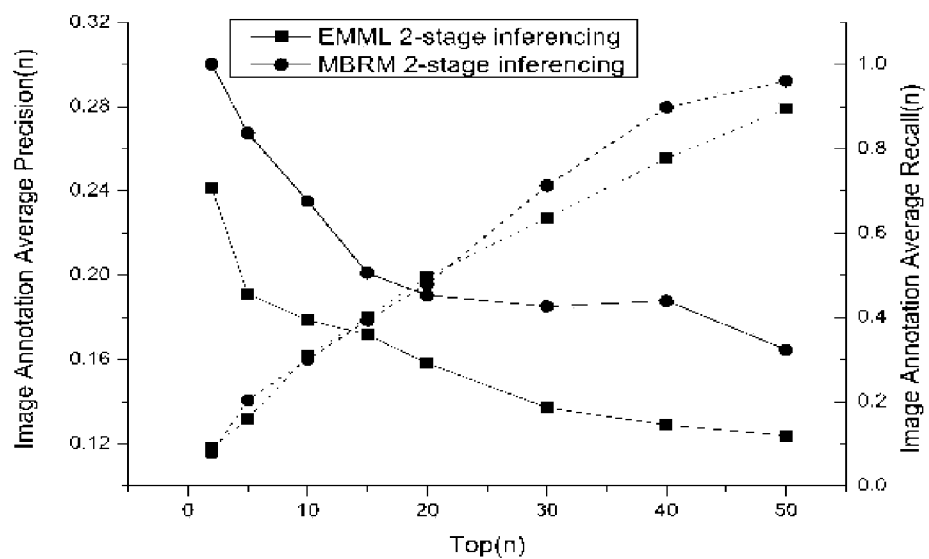
FIG. 7 shows precisions and recalls of 2-stage image to word inferencing between EMML and MBRM.
Figure 8:
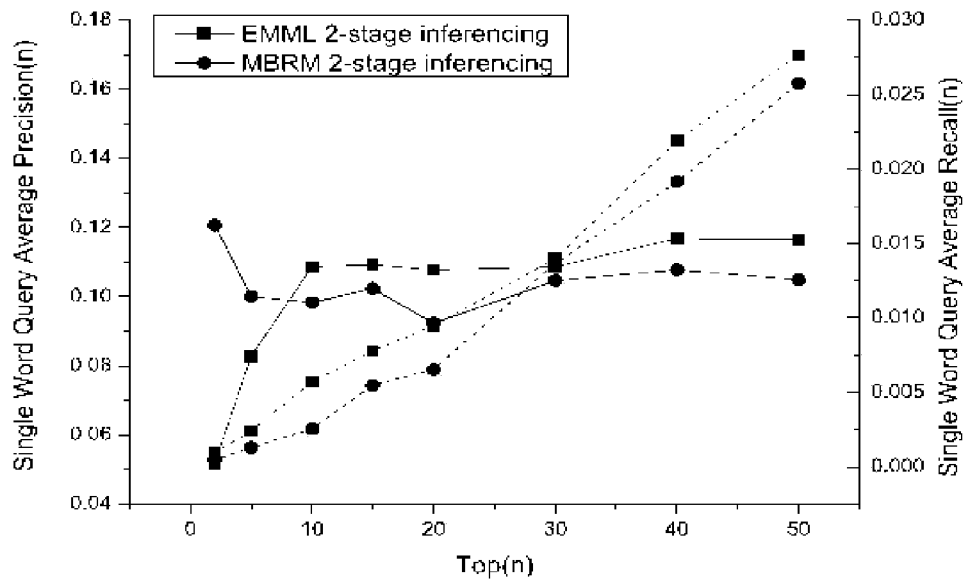
FIG. 8 shows precisions and recalls of 2-stage word to image inferencing between EMML and MBRM.
Figure 9:
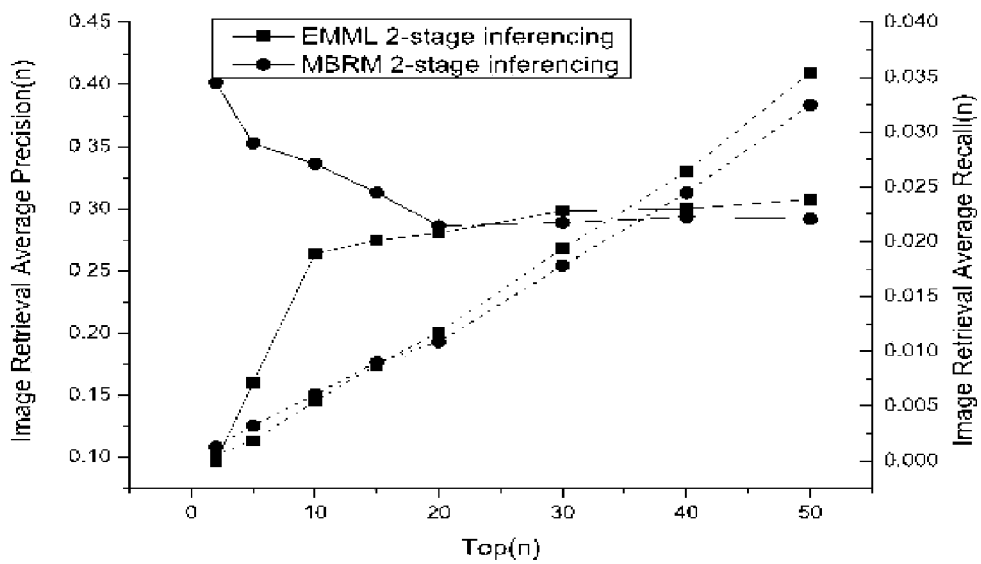
FIG. 9: shows precisions and recalls of 2-stage image to image inferencing between EMML and MBRM.
Figure 10:
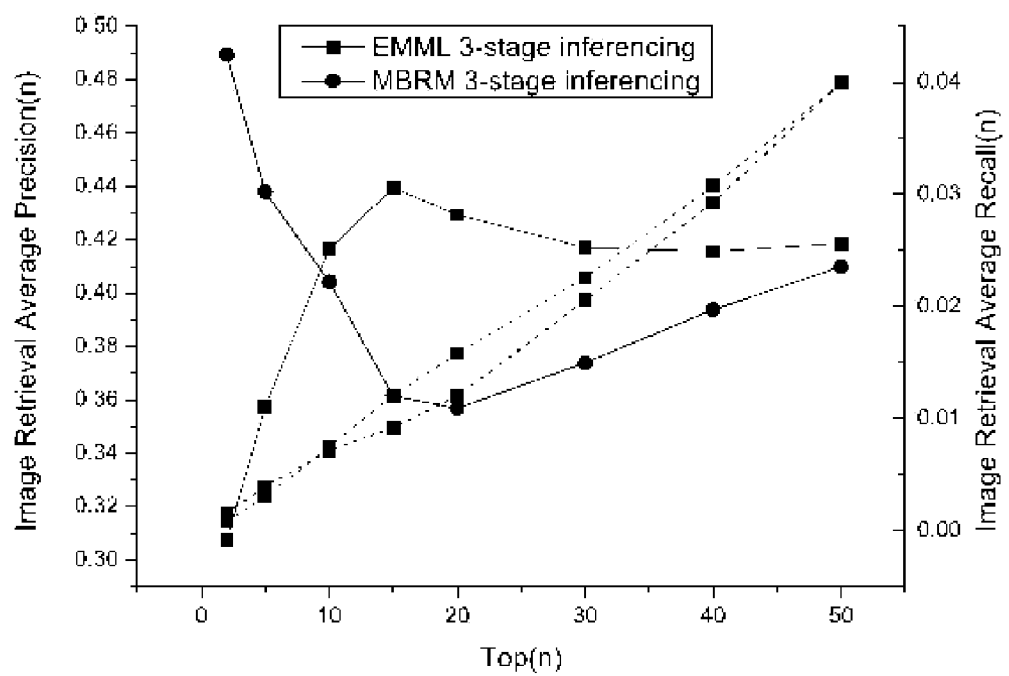
FIG. 10 shows precisions and recalls of 3-stage image to image inferencing between EMML and MBRM.

For the 2-stage inferencing, FIG. 7 reports the precisions and recalls averaged over 1648 queries for image-to-word inferencing in comparison with MBRM model, and FIG. 8 reports the precisions and recalls averaged over 64 queries for word-to-image inferencing in comparison with MBRM model. FIG. 9 reports the precisions and recalls averaged over 1648 queries for image-to-image inferencing in comparison with MBRM model. Finally, for the 3-stage inferencing, FIG. 10 reports precisions and recalls averaged over 1100 queries for image-to-image inferencing in comparison with MBRM model.

In summary, there is no single winner for all the cases. Overall, EMML outperforms MBRM substantially in the scenarios of word query and image retrieval, and slightly in the scenario of 2-stage word-to-image inferencing and 3-stage image-to-image inferencing. On the other hand, MBRM has a slight better performance than EMML in the scenario of 2-stage image-to-word inferencing. For all other scenarios the two methods have a comparable performance. In order to demonstrate the strong scalability of EMML approach to multimodal data mining, image annotation is taken as a case study and the scalability compared between EMML and MBRM. Three subsets of the embryo image database are randomly selected in different scales (50, 100, 150 images, respectively), and both methods applied to the subsets to measure the query response time. The query response time is obtained by taking the average response time over 1648 queries. Since EMML is implemented in MATLAB environment and MBRM is implemented in C in Linux environment, to ensure a fair comparison, the scalability is reported as the relative ratio of a response time to the baseline response time for the respective methods.

Here the baseline response time is the response time to the smallest scale subset (i.e., 50 images). Table 1 documents the scalability comparison. Clearly, MBRM exhibits a linear scalability with respect to the database size while that of EMML is constant. This is consistent with the scalability analysis in Sec. 5.

TABLE 1

| | Comparison of scalability | | |
|---|---|---|---|
| Database Size | 50 | 100 | 150 |
| EMML | 1 | 1 | 1 |
| MBRM | 1 | 2.2 | 3.3 |

In order to verify the fast learning advantage of EMML in comparison with the existing max margin based learning literature, one of the most recently proposed max margin learning methods by Taskar et al. [19] ws implemented. For the reference purpose, this method is called TCKG. Both EMML and TCKG have been applied to a small data set randomly selected from the whole Berkeley embryo database, consisting of 110 images along with their annotation words. The reason this small data set is used for the comparison is that it has been found that in MATLAB platform TCKG immediately runs out of memory when the data set is larger, due to the large number of the constraints, which is typical for the existing max margin learning methods. Under the environment of 2.2 GHz CPU and 1 GB memory, TCKG takes about 14 hours to complete the learning for such a small data set while EMML only takes about 10 minutes. The number of the constraints reduced has been examined in both methods during their executions for this data set. EMML has reduced the number of the constraints in a factor of 70 times more than that reduced by TCKG. This explains why EMML is about 70 times faster than TCKG in learning for this data set.

7. CONCLUSION

A new max margin learning framework is developed—the enhanced max margin learning (EMML), and applied it to developing an effective and efficient multimodal data mining solution. EMML attempts to find a small set of active constraints, and thus is more efficient in learning than the existing max margin learning literature. Consequently, it has a much faster convergence rate which is verified in empirical evaluations. The multimodal data mining solution based on EMML is highly scalable in the sense that the query response time is independent of the database scale. This advantage is also supported through the complexity analysis as well as empirical evaluations. While EMML is a general learning framework and can be used for general multimodal data mining, for the evaluation purpose, it has been applied to the Berkeley Drosophila embryo image database and have reported the evaluations against a state-of-the-art multimodal data mining method.

The present method may be implemented on a general purpose computer or a specially adapted machine. Typically, a programmable processor will execute machine-readable instructions stored on a computer-readable medium. In other cases, the method will be implemented using application specific hardware, and may not be reprogrammable.

An exemplary programmable computing device for implementing an embodiment of the invention includes at least a processing unit and a memory. Depending on the exact configuration and type of computing device, the memory may be volatile (such as RAM), non-volatile (such as ROM, flash memory, etc.) or some combination of the two. Additionally, the device may also have additional features/functionality. For example, the device may also include additional storage (removable and/or non-removable) including, but not limited to, magnetic or optical disks or tapes. Computer storage media includes volatile and nonvolatile, removable and non-removable media implemented in any method or technology for storage of information such as computer readable instructions, data structures, program modules or other data. The memory, the removable storage and the non-removable storage are all examples of computer storage media. Computer storage media includes, but is not limited to, RAM, ROM, EEPROM, flash memory, FRAM, or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the device. The device may also contain one or more communications connections that allow the device to communicate with other devices. Such communication connections may include, for example, Ethernet, wireless communications, optical communications, serial busses, parallel busses, and the like. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. As discussed above, the term computer readable media as used herein includes both storage media and communication media.

One use for the present method is to process information databases, which may be private or public. For example, the information database may comprise information received from the Internet, such as the content of various web pages from world wide web sites, or other information found on the Internet. In other cases, the data may be more structured, for example the content of the Facebook social networking site/system. Further, the information may be private user information, such as the contents of a user's hard drive, especially, for example, the user generated or downloaded content.

Having described specific embodiments of the present invention, it will be understood that many modifications thereof will readily appear or may be suggested to those skilled in the art, and it is intended therefore that this invention is limited only by the spirit and scope of the following claims.

9. REFERENCES

[1] www.fruitfly.org/.
[2] Y. Altun, I. Tsochantaridis, and T. Hofmann. Hidden markov support vector machines. In *Proc. ICML*, Washington D.C., 2003.
[3] K. Barnard, P. Duygulu, D. Forsyth, N. de Freitas, D. M. Blei, and M. I. Jordan. Matching words and pictures. *Journal of Maching Learning Research*, 3:1107-1135, 2003.
[4] D. Blei and M. Jordan. Modeling annotated data. In *Proceedings of the 26th annual International ACM SIGIR Conference on Research and Development in Information Retrieval*, pages 127-134, 2003.
[5] S. Boyd and L. Vandenberghe. *Convex Optimization*. Cambridge University Press, 2004.
[6] U. Brefeld and T. Scheffer. Semi-supervised learning for structured output variables. In *Proc. ICML*, Pittsburgh, Pa., 2006.

[7] E. Chang, K. Goh, G. Sychay, and G. Wu. Cbsa: content-based soft annotation for multimodal image retrieval using bayes point machines. *IEEE Trans. on Circuits and Systems for Video Technology*, 13:26-38, January 2003.

[8] W. Chu, Z. Ghahramani, and D. L. Wild. A graphical model for protein secondary structure prediction. In *Proc. ICML*, Banff, Canada, 2004.

[9] R. Datta, W. Ge, J. Li, and J. Z. Wang. Toward bridging the annotation-retrieval gap in image search by a generative modeling approach. In *Proc. ACM Multimedia*, Santa Barbara, Calif., 2006.

[10] P. Duygulu, K. Barnard, N. de Freitas, and D. Forsyth. Object recognition as machine translation: Learning a lexicon for a fixed image vocabulary. In *Seventh European Conference on Computer Vision*, volume IV, pages 97-112, 2002.

[11] S. L. Feng, R. Manmatha, and V. Lavrenko. Multiple bernoulli relevance models for image and video annotation. In *International Conference on Computer Vision and Pattern Recognition*, Washington D.C., 2004.

[12] Y. Freund and R. E. Schapire. Large margin classification using the perceptron algorithm. In *Maching Learning*, volume 37, 1999.

[13] H. D. III and D. Marcu. Learning as search optimization: Approximate large margin methods for structured prediction. In *Proc. ICML*, Bonn, Germany, 2005.

[14] J. Lafferty, A. McCallum, and F. Pereira. Conditional random fields: Probabilistic models for segmenting and labeling sequence data. In *Proc. ICML*, 2001.

[15] A. McCallum, D. Freitag, and F. Pereira. Maximum entropy markov models for information extraction and segmentation. In *Proc. ICML*, 2000.

[16] E. Osuna, R. Freund, and F. Girosi. An improved training algorithm for support vector machines. In *Proc. of IEEE NNSP '97*, Amelia Island, Fla., September 1997.

[17] J.-Y. Pan, H.-J. Yang, C. Faloutsos, and P. Duygulu. Automatic multimedia cross-modal correlation discovery. In *Proceedings of the 10th ACM SIGKDD Conference*, Seattle, Wash., 2004.

[18] A. W. M. Smeulders, M. Worring, S. Santini, A. Gupta, and R. Jain. Content-based image retrieval at the end of the early years. *IEEE Trans. on Pattern Analysis and Machine Intelligence*, 22:1349-1380, 2000.

[19] B. Taskar, V. Chatalbashev, D. Koller, and C. Guestrin. Learning structured prediction models: A large margin approach. In *Proc. ICML*, Bonn, Germany, 2005.

[20] B. Taskar, C. Guestrin, and D. Koller. Max-margin markov networks. In *Neural Information Processing Systems Conference*, Vancouver, Canada, 2003.

[21] I. Tsochantaridis, T. Hofmann, T. Joachims, and Y. Altun. Support vector machine learning for interdependent and structured output spaces. In *Proc. ICML*, Banff, Canada, 2004.

[22] V. N. Vapnik. *The nature of statistical learning theory*. Springer, 1995.

[23] Y. Wu, E. Y. Chang, and B. L. Tseng. Multimodal metadata fusion using causal strength. In *Proc. ACM Multimedia*, pages 872-881, Hilton, Singapore, 2005.

What is claimed is:

1. A method comprising:
   representing each of a plurality of images in a database as information in an image space;
   associating a label word set, from an annotation word space, with each of the plurality of images, to define a plurality of training instances, each respective training instance comprising a respective image and a respective associated label word set, and having at least one constraint;
   computing a feature vector in a feature space for each of the plurality of images;
   automatically clustering the respective feature vectors in the feature space into a plurality of clusters, grouping similar feature vectors together within a common cluster, and determining a visual representative for each of the plurality of clusters;
   structuring the annotation word space, to produce a structured annotation word space, based on at least the clustering of the respective features in the feature space and an association of respective associated label word sets with respective images, using an at least one automated optimization processor configured to perform an enhanced max-margin learning optimization in a dual space, dependent on inner products in a joint feature space of the feature vectors and the structured annotation word space, to minimize a prediction error of associated label words of the annotation word space for the plurality of training instances;
   storing information representing the structured annotation word space in a memory after the optimization; and
   receiving a query comprising at least one of a query image and a query semantic expression, and producing, or identifying in response, a response comprising at least one of an response image and a response semantic expression, selectively dependent on the structured annotation word space in the memory after the optimization.

2. The method according to claim 1, wherein the visual representative is a centroid of a respective cluster in the image space, further comprising determining a representative annotation word set for the determined visual representative for at least one respective cluster of the plurality of clusters.

3. The method according to claim 1, wherein the visual representative is a selected image of the plurality of images, further comprising selecting representative annotation words for a respective cluster dependent on the selected image.

4. The method according to claim 1, wherein each respective image of the plurality of images has a plurality of image blocks, each image block being associated with a respective image block label word set and a respective image block feature vector.

5. The method according to claim 1, wherein structured annotation word space comprises interdependent annotation words.

6. The method according to claim 1, further comprising optimizing the joint feature space by selecting weighting coefficients for a linear combination of a plurality of joint feature mapping vectors representing a relationship between each of the plurality of images and the associated label word set, based on at least one optimization criterion.

7. The method according to claim 1, wherein the query comprises a query semantic expression word from the annotation word space image, and the response selectively dependent on the structured annotation word space, comprises a response image.

8. The method according to claim 1, further comprising receiving an query image and automatically outputting the query semantic expression comprising a set of annotation words from the structured annotation word space describing the query image.

9. The method according to claim 8, further comprising:
partitioning the query image into a plurality of blocks;
computing a feature vector in the feature space for each of the plurality of blocks;
computing a similarity of each feature vector with a plurality of visual representatives;
selecting a set of most relevant visual representatives based on at least the computed similarities;
determining a score relating a list of annotation words from the structured annotation word space and each of the selected most relevant visual representatives;
merging and ranking the list of annotation words according to the respective determined score for each annotation word;
defining the output set of annotation words as a subset of the list of annotation words which represent the highest ranked annotation words.

10. The method according to claim 9, wherein said determining a score relating a list of annotation words from the structured annotation word space and each of the selected most relevant visual representatives is performed prior to receiving the input image.

11. The method according to claim 1, further comprising receiving the query image, and selecting at least one image related to the query image based on a relation of the query image to the selected at least one image in the joint feature space.

12. The method according to claim 1, further comprising:
determining a score representing a quantitative relation between each visual representative and the query;
selecting a subset of the visual representatives most relevant to the query dependent on the determined score;
computing a similarity score between the selected subset of visual representatives and a plurality of images in the database;
merging and sorting the plurality of images in the database based on at least the computed similarity scores; and
determining a most relevant subset of the plurality of images based on merged and sorted plurality of images in the database based on at least the computed similarity scores,
wherein the the most relevant subset comprises the response image.

13. The method according to claim 12, wherein said determining a score representing the quantitative relation between each visual representative and the query is performed prior to receiving the query.

14. The method according to claim 1, further comprising:
receiving a query image;
determining at least one visual representative image for the query image;
determining a set of annotation words for each of the at least one visual representative image based on at least the structured annotation word space;
determining a subset of the plurality of images in the database which have a highest relevance to the determined set of annotation words for the at least one visual representative image; and
outputting the determined a subset of the plurality of images in the database as the response image.

15. The method according to claim 1, further comprising:
determining at least one selected visual representative image corresponding to the query;
determining a set of annotation words for each of the at least one selected visual representative image, dependent on at least the structured annotation word space;
determining a subset of the plurality of images in the database which have a highest relevance to the determined set of annotation words for the determined at least one selected visual representative image;
outputting the determined subset of the plurality of images in the database as the response image.

16. A method, comprising:
defining a multimodal data set comprising objects having image information and semantic labels of the image information in a semantic space, comprising a plurality of training instances, each training instance comprising an object and at least one associated semantic label, and having at least one constraint;
representing the image information as a set of feature vectors in an image feature space by automatically processing the multimodal data set on at least one automated processor;
automatically clustering the objects, with the at least one automated processor, based on the set of feature vectors in the image feature space, to group objects having similar image features together within common clusters;
structuring the semantic space with at least one automated optimization processor, to produce a structured semantic space, based on at least the clustering of the objects in the image feature space, and an association of respective semantic labels with respective objects, configured to perform an enhanced max-margin learning optimization in a dual space, dependent on inner products in a joint feature space of the feature vectors and the structured semantic space, to minimize a prediction error for the training instances having the at least one constraint,
storing information defining the structured semantic space in at least one memory after the optimization; and
receiving a query comprising at least one of a query image and a query semantic expression, and producing or identifying in response, a response comprising at least one of an response image and a response semantic expression, selectively dependent on the structured semantic space in the at least one memory.

17. The method according to claim 16, further comprising:
determining representative image information for each respective cluster;
determining representative semantic annotations in the semantic space for the representative image information for each respective cluster; and
using the representative semantic annotations to retrieve at least one object from an automated database storing the multimodal data set.

18. The method according to claim 16, further comprising classifying the query based on at least a relation of a feature vector representing the query image to the structured semantic space.

19. The method according to claim 18, further comprising automatically annotating an object represented in the query with semantic annotations based on the structured annotation semantic space.

20. An apparatus, comprising:
a database comprising a plurality of images each representing information in an image space;
a label word set, in an annotation word space, associated with each of the plurality of images;

at least a portion of the plurality of images being training instances, each training instance comprising image information, a label word set, and at least one constraint;

a feature vector in a feature space, for each of the plurality of images;

at least one processor configured to:
   automatically cluster the feature space into a plurality of clusters, each respective cluster grouping similar feature vectors together within a common cluster;
   automatically structure the annotation word space, to produce a structured annotation word space, based on at least the clustering in the feature space and an association of respective label word sets with respective images, using an optimization algorithm comprising an enhanced max-margin learning optimization in a dual space, dependent on inner products in a joint feature space of the feature vectors and the structured annotation word space, to minimize a prediction error for the training instances having the at least one constraint; and
   receiving at least one of a query image and a query semantic expression, and producing in response, at least one of an response image and a response semantic expression, selectively dependent on the structured annotation word space;

a memory configured to store information representing the structured annotation word space after the optimization; and an output configured to present the at least one of the response image and the response semantic expression dependent on the structured annotation word space in the memory.

\* \* \* \* \*